United States Patent
Yabuki

(10) Patent No.: US 11,815,753 B2
(45) Date of Patent: Nov. 14, 2023

(54) LIQUID CRYSTAL DISPLAY APPARATUS AND DRIVING METHOD OF THE SAME

(71) Applicant: SHARP KABUSHIKI KAISHA, Sakai (JP)

(72) Inventor: Haruhito Yabuki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/942,070

(22) Filed: Sep. 9, 2022

(65) Prior Publication Data

US 2023/0083840 A1    Mar. 16, 2023

Related U.S. Application Data

(60) Provisional application No. 63/244,643, filed on Sep. 15, 2021.

(51) Int. Cl.
| | | |
|---|---|---|
| G02F 1/133 | (2006.01) | |
| G02F 1/1362 | (2006.01) | |
| G02F 1/1368 | (2006.01) | |
| G02F 1/1343 | (2006.01) | |
| G02F 1/137 | (2006.01) | |
| G02F 1/1345 | (2006.01) | |
| G09G 3/36 | (2006.01) | |
| G09G 3/20 | (2006.01) | |

(52) U.S. Cl.
CPC .......... *G02F 1/13306* (2013.01); *G02F 1/137* (2013.01); *G02F 1/1368* (2013.01);
(Continued)

(58) Field of Classification Search
CPC ........... G02F 1/136213; G02F 1/13306; G02F 1/13624; G02F 1/136286; G09G 3/3674; G09G 3/3685; G09G 3/3648
See application file for complete search history.

(56) References Cited

U.S. PATENT DOCUMENTS

| | | |
|---|---|---|
| 2007/0064164 A1 | 3/2007 | Tasaka et al. |
| 2008/0165109 A1 | 7/2008 | Joo et al. |

(Continued)

FOREIGN PATENT DOCUMENTS

| | | | |
|---|---|---|---|
| JP | 2006-276411 A | 10/2006 | |
| JP | 2008-170995 A | 7/2008 | |
| WO | WO-2020012655 A1 * | 1/2020 | .......... G09G 3/3677 |

*Primary Examiner* — Yuzhen Shen
(74) *Attorney, Agent, or Firm* — ScienBiziP, P.C.

(57) ABSTRACT

A liquid crystal display apparatus switches modes from a normal display mode to a stop preparation mode when a main power source voltage drops. In the display mode, a gate drive circuit sequentially applies a first gate-on pulse to gate bus lines so as to select pixel rows sequentially, and applies a second gate-on pulse to buffer capacitor scanning lines, each of which is associated with a pixel row selected by the first gate-on pulse, during a period that does not overlap a period during which the first gate-on pulse is applied, and a source drive circuit applies a display signal voltage to source bus lines. In the stop preparation mode, the gate drive circuit sequentially applies the first gate-on pulse to the gate bus lines so as to select the pixel rows sequentially, and applies the second gate-on pulse to the buffer capacitor scanning lines, each of which is associated with the pixel row selected by the first gate-on pulse, during a period that at least partially overlaps a period during which the first gate-on pulse is applied, and the source drive circuit applies 0 V to the source bus lines.

14 Claims, 15 Drawing Sheets

(52) U.S. Cl.
CPC ...... *G02F 1/13454* (2013.01); *G02F 1/13624* (2013.01); *G02F 1/134309* (2013.01); *G02F 1/136213* (2013.01); *G02F 1/136286* (2013.01); *G09G 3/2096* (2013.01); *G09G 3/3674* (2013.01); *G09G 3/3685* (2013.01); *G02F 2202/10* (2013.01); *G09G 2300/0426* (2013.01); *G09G 2310/0286* (2013.01); *G09G 2310/0291* (2013.01); *G09G 2330/021* (2013.01)

(56) References Cited

U.S. PATENT DOCUMENTS

| | | | | |
|---|---|---|---|---|
| 2011/0285930 | A1* | 11/2011 | Kimura | H01L 27/1225 349/43 |
| 2012/0176354 | A1* | 7/2012 | Katsuta | G09G 3/3648 345/204 |
| 2012/0229723 | A1* | 9/2012 | Katsuta | G09G 3/3648 349/42 |
| 2012/0249512 | A1* | 10/2012 | Ohhashi | G09G 3/3659 345/211 |
| 2012/0306732 | A1* | 12/2012 | Sugihara | G09G 3/3607 345/88 |
| 2013/0328850 | A1* | 12/2013 | You | G02F 1/13624 345/211 |
| 2015/0154723 | A1* | 6/2015 | Wu | G09G 3/003 345/522 |
| 2018/0252971 | A1* | 9/2018 | Irie | G09G 3/3655 |
| 2021/0166649 | A1* | 6/2021 | Hao | G02F 1/13624 |
| 2021/0272530 | A1* | 9/2021 | Hosoya | G09G 3/3677 |

\* cited by examiner

LIQUID CRYSTAL DISPLAY APPARATUS AND DRIVING METHOD OF THE SAME

CROSS-REFERENCE TO RELATED APPLICATIONS

This application claims the benefit of priority to U.S. Provisional Application No. 63/244,643 filed on Sep. 15, 2021. The entire contents of the above-identified application are hereby incorporated by reference.

BACKGROUND

Technical Field

The disclosure relates to a liquid crystal display apparatus and a driving method thereof, and particularly to a structure and a driving method suitable for a large and high resolution liquid crystal display apparatus.

Liquid crystal display apparatuses tend to be larger and have higher resolution. In order to improve the gray scale display characteristics (y characteristics) at oblique viewing angles, liquid crystal display apparatuses are widespread in which each pixel consists of a first pixel (bright pixel) that displays a gray scale higher than a gray scale to be displayed and a second pixel (dark pixel) that displays a lower gray scale than the gray scale to be displayed. Such a pixel structure is sometimes referred to as a multi-pixel structure or a pixel division structure. The first pixel and the second pixel possessed by each pixel are sometimes referred to as a first subpixel (bright subpixel) and a second subpixel (dark subpixel), respectively.

A liquid crystal display apparatus having a multi-pixel structure and including three thin film transistors (TFTs) in each pixel is disclosed in JP 2006-276411 A. Hereinafter, a structure in which each pixel includes three TFTs described in JP 2006-276411 A is sometimes referred to as a "three-TFT structure". The entire disclosure of JP 2006-276411 A is incorporated herein by reference.

Two TFTs of the three TFTs turn on and off connections between pixel electrodes of the first pixel (bright pixel) and the second pixel (dark pixel) and a source bus line, respectively. For example, a drain electrode of a first TFT is connected to a first pixel electrode of the first pixel, and a drain electrode of a second TFT is connected to a second pixel electrode of the second pixel. Gate electrodes of the first TFT and the second TFT are connected to a common gate bus line, and source electrodes of the first TFT and the second TFT are connected to a common source bus line. A third TFT, which is the remaining one of the three TFTs, turns on and off a connection between a buffer capacitor electrode and the second pixel electrode. A gate electrode of the third TFT is connected to a (e.g., (n+1)th) gate bus line next stage of a (e.g., nth) gate bus line to which the gate electrodes of the first TFT and the second TFT are connected.

The first TFT and the second TFT are simultaneously turned on by a gate-on pulse included in a gate scanning signal supplied to the common gate bus line, and a display signal voltage supplied to the common source bus line is applied to the first pixel electrode and the second pixel electrode. After the first TFT and the second TFT are turned off, the third TFT is turned on and the second pixel electrode and the buffer capacitor electrode are connected. Since the second liquid crystal capacitor including the second pixel electrode and the buffer capacitor including the buffer capacitor electrode are connected, the charge accumulated in the second liquid crystal capacitor is transferred to the buffer capacitor, and as a result, the voltage held by the second liquid crystal capacitor decreases and the second pixel becomes a dark pixel.

SUMMARY

According to the study of the present inventor, a liquid crystal display apparatus having a three-TFT structure as described in JP 2006-276411 A may cause image sticking (afterimage) of the image displayed immediately before when the power is turned off. This is because, by using the buffer capacitor to create the dark pixel (second pixel), it takes a long time for the charge accumulated in the second liquid crystal capacitor included in the dark pixel to be discharged. Since DC voltage continues to be applied to a liquid crystal layer of the second liquid crystal capacitor until the charge accumulated in the second liquid crystal capacitor is discharged, image sticking (afterimage) may occur. This problem is remarkable when a TFT having high off-resistance such as an oxide semiconductor TFT is used as the TFT.

JP 2008-170995 A discloses a technique for reducing the afterimage in a liquid crystal display apparatus having normal pixels by shortening the time required to apply 0 V to all pixels by simultaneously selecting a plurality of gate bus lines to simultaneously supply 0 V to pixels belonging to a plurality of pixel rows after turning off the power source.

However, since the plurality of gate bus lines are selected simultaneously to simultaneously supply 0 V to the pixels belonging to the plurality of pixel rows, the increase in power consumption becomes a problem. Further, an increase in the current flowing in the power source line of the gate driver may cause the gate driver to be destroyed or the power source wiring line for the gate driver to burn out. Such defects are more likely to occur when the liquid crystal display apparatus is larger and has higher resolution.

Thus, the disclosure provides a liquid crystal display apparatus and a driving method thereof that can suppress image sticking when the power is turned off in a liquid crystal display apparatus having a three-TFT structure without increasing power consumption.

According to embodiments of the disclosure, solutions according to the following items are provided.

Item 1

A liquid crystal display apparatus includes
  a plurality of pixels arranged in a matrix having a plurality of pixel rows and a plurality of pixel columns,
  a plurality of gate bus lines, each of which is associated with one of the plurality of pixel rows,
  a plurality of source bus lines, each of which is associated with one of the plurality of pixel columns, and
  a plurality of buffer capacitor scanning lines, each of which is associated with one of the plurality of pixel rows,
  in which each of the plurality of pixels includes
  a first liquid crystal capacitor including a first pixel electrode,
  a second liquid crystal capacitor including a second pixel electrode,
  a first TFT with a drain electrode connected to the first pixel electrode,
  a second TFT with a drain electrode connected to the second pixel electrode, and
  a buffer capacitor including a buffer capacitor electrode connected to the second pixel electrode via a third TFT, gate electrodes of the first TFT and the second TFT of each pixel of the plurality of pixels are connected to a gate bus line associated with a pixel row including the pixel, source electrodes of the first TFT and the second TFT of each pixel of the plurality of pixels are connected to a source bus line associated with a pixel column including the pixel, a gate electrode of the third TFT of each pixel of the plurality of pixels is connected to a buffer capacitor scanning line associated with a pixel row including the pixel, the liquid crystal display apparatus further includes a gate drive circuit configured to supply a gate scanning signal including a first gate-on pulse configured to turn on the first TFT and the second TFT to each of the plurality of gate bus lines, and a buffer capacitor scanning signal including a second gate-on pulse configured to turn on the third TFT to each of the plurality of buffer capacitor scanning lines, a source drive circuit configured to supply a source signal to each of the plurality of source bus lines, and a control circuit configured to supply a power source voltage and a control signal to each of the gate drive circuit and the source drive circuit, and the control circuit is configured to switch modes from a display mode for normal display to a stop preparation mode in a case that a main power source voltage supplied to the control circuit drops, and control the gate drive circuit and the source drive circuit to cause, in the display mode, the gate drive circuit to sequentially select the plurality of pixel rows by sequentially applying the first gate-on pulse to the plurality of gate bus lines, and sequentially apply the second gate-on pulse to the plurality of buffer capacitor scanning lines, each of which is associated with the pixel row selected by the first gate-on pulse, during a period that does not overlap a period during which the first gate-on pulse is applied, and the source drive circuit to apply a display signal voltage for normal display to the plurality of source bus lines, and in the stop preparation mode, the gate drive circuit to sequentially select the plurality of pixel rows by sequentially applying the first gate-on pulse to the plurality of gate bus lines, and sequentially apply the second gate-on pulse to the plurality of buffer capacitor scanning lines, each of which is associated with the pixel row selected by the first gate-on pulse, during a period that at least partially overlaps a period during which the first gate-on pulse is applied, and the source drive circuit to apply 0 V to the plurality of source bus lines.

Item 2

In the liquid crystal display apparatus described in item 1, the control circuit includes a power source circuit configured to supply the power source voltage to each of the gate drive circuit and the source drive circuit, and a signal circuit configured to supply the control signal to each of the gate drive circuit and the source drive circuit, the power source circuit includes a detection circuit configured to generate a detection signal and outputs the detection signal to the signal circuit in a case that the main power source voltage is lower than a predetermined value, and in a case that the signal circuit receives the detection signal, the signal circuit is configured to switch modes from the display mode to the stop preparation mode.

Item 3

In the liquid crystal display apparatus described in item 2, the control circuit further includes a hold capacitor electrically connected to an input terminal of the main power source voltage via a switch and supplies the power source voltage from the hold capacitor to the gate drive circuit in the stop preparation mode.

Item 4

In the liquid crystal display apparatus described in any one of items 1 to 3, the gate drive circuit includes a first shift register configured to determine a phase of the first gate-on pulse of the gate scanning signal supplied to each of the plurality of gate bus lines based on an output of each of a plurality of stages, and a second shift register configured to determine a phase of the second gate-on pulse of the buffer capacitor scanning signal supplied to each of the plurality of buffer capacitor scanning lines based on an output of each of a plurality of stages, the control circuit supplies common clock signals to the first shift register and the second shift register, supplies a first start pulse signal including a first start pulse to the first shift register, and supplies a second start pulse signal including a second start pulse to the second shift register, and the control circuit is configured to, in the display mode, within one vertical scanning period, apply the first start pulse to the first shift register and, after a lapse of a first period after applying the first start pulse to the first shift register, apply the second start pulse to the second shift register, and in the stop preparation mode, within one vertical scanning period, apply the first start pulse to the first shift register and, substantially simultaneously with application of the first start pulse to the first shift register or after a lapse of a second period shorter than the first period, apply the second start pulse to the second shift register, or within one vertical scanning period, apply the second start pulse to the second shift register and substantially simultaneously with application of the second start pulse to the second shift register or after a lapse of a third period after the application of the second start pulse to the second shift register, apply the first start pulse to the first shift register.

Item 5

In the liquid crystal display apparatus described in item 4, TgapA=Tg1$on$W−(Tg2−Tg1), TgapB=Tg2$on$W−(Tg1−Tg2), the first period is longer than TgapA, the second period is equal to or shorter than TgapA, and the third period is equal to or shorter than TgapB where a period from a rise of the first start pulse to a rise of the first gate-on pulse is Tg1, a period from a rise of the second start pulse to a rise of the second gate-on pulse is Tg2, a width of the first gate-on pulse is Tg1$on$W, a width of the second gate-on pulse is Tg2$on$W, a period from the rise of the first start pulse to the rise of the second start pulse in a case that a fall of the first gate-on pulse coincides with the rise of the second gate-on pulse is TgapA, and a period from the rise of the second start pulse to the rise of the first start pulse in a case that a fall of the second gate-on pulse coincides with the rise of the first gate-on pulse is TgapB.

Item 6

In the liquid crystal display apparatus described in any one of items 1 to 3, in the stop preparation mode, the control circuit is configured to cause the gate drive circuit, within one vertical scanning period, to apply the first gate-on pulse to each of the plurality of gate bus lines two or more times, apply the second gate-on pulse to each of the plurality of buffer capacitor scanning lines two or more times, and apply a first instance of the second gate-on pulse to the buffer capacitor scanning line associated with a pixel row selected by a second instance of the first gate-on pulse.

Item 7

In the liquid crystal display apparatus described in item 6, the buffer capacitor scanning line associated with a certain pixel row is electrically connected to the gate bus line associated with a pixel row n rows away from the certain pixel row, and n is an integer of 1 to 4 in a case of m=2, and an integer of m−2 to m+2 in a case of m≠2, the gate drive circuit includes a shift register configured to determine a phase of the first gate-on pulse of the gate scanning signal supplied to each of the plurality of gate bus lines and a phase of the second gate-on pulse of the buffer capacitor scanning signal supplied to each of the plurality of buffer capacitor scanning lines based on an output of each of the plurality of stages, the control circuit supplies m types of clock signals (m is an integer of 2 or greater) having different phases from each other and a start pulse signal including a start pulse to the shift register, and in the stop preparation mode, the control circuit applies a start pulse to the shift register two or more times within one vertical scanning period.

Item 8

In the liquid crystal display apparatus described in item 7, a cycle of the m types of clock signals is three times or more of one horizontal scan period.

Item 9

In the liquid crystal display apparatus described in any one of items 6 to 8, the shift register includes a plurality of unit circuits, each of which includes at least one TFT.

Item 10

In the liquid crystal display apparatus described in any one of items 1 to 9, each of the plurality of pixels further includes a first auxiliary capacitor including a first auxiliary capacitor electrode electrically connected to the first pixel electrode, and a second auxiliary capacitor including a second auxiliary capacitor electrode electrically connected to the second pixel electrode, and in each of the plurality of pixels, a buffer capacitor counter electrode constituting the buffer capacitor by facing the buffer capacitor electrode with a dielectric layer interposed between the buffer capacitor counter electrode and the buffer capacitor electrode is electrically connected to a second auxiliary capacitor counter electrode constituting the second auxiliary capacitor by facing the second auxiliary capacitor electrode with a dielectric layer between the second auxiliary capacitor counter electrode and the second auxiliary capacitor electrode.

Item 11

In the liquid crystal display apparatus described in any one of items 1 to 10, in the display mode, a polarity of the display signal voltage supplied to the plurality of source bus lines is inverted for each vertical scanning period.

Item 12

In the liquid crystal display apparatus described in any one of items 1 to 11, each of the first TFT, the second TFT, and the third TFT includes a TFT having an oxide semiconductor layer.

Item 13

In the liquid crystal display apparatus described in item 12, the oxide semiconductor layer includes an In—Ga—Zn—O semiconductor.

Item 14

A driving method of a liquid crystal display apparatus, the liquid crystal display apparatus including
  a plurality of pixels arranged in a matrix having a plurality of pixel rows and a plurality of pixel columns,
  a plurality of gate bus lines, each of which is associated with one of the plurality of pixel rows,
  a plurality of source bus lines, each of which is associated with one of the plurality of pixel columns, and
  a plurality of buffer capacitor scanning lines, each of which is associated with one of the plurality of pixel rows,
  each of the plurality of the pixels including
    a first liquid crystal capacitor including a first pixel electrode,
    a second liquid crystal capacitor including a second pixel electrode,
    a first TFT with a drain electrode connected to the first pixel electrode,
    a second TFT with a drain electrode connected to the second pixel electrode, and
    a buffer capacitor including a buffer capacitor electrode connected to the second pixel electrode via a third TFT,
  gate electrodes of the first TFT and the second TFT of each pixel of the plurality of pixels being connected to a gate bus line associated with a pixel row including the pixel,
  source electrodes of the first TFT and the second TFT of each pixel of the plurality of pixels being connected to a source bus line associated with a pixel column including the pixel,
  a gate electrode of the third TFT of each pixel of the plurality of pixels being connected to a buffer capacitor scanning line associated with a pixel row including the pixel, and
  the liquid crystal display apparatus further including
    a gate drive circuit configured to supply a gate scanning signal including a first gate-on pulse configured to turn on the first TFT and the second TFT to each of the plurality of gate bus lines, and a buffer capacitor scanning signal including a second gate-on pulse configured to turn on the third TFT to each of the plurality of buffer capacitor scanning lines,
    a source drive circuit configured to supply a source signal to each of the plurality of source bus lines, and
    a control circuit configured to supply a power source voltage and a control signal to each of the gate drive circuit and the source drive circuit, the driving method includes causing the control circuit to switch modes from a display mode for normal display to a stop preparation mode in a case that a main power source voltage supplied to the control circuit drops, and control the gate drive circuit and the source drive circuit to make in the display mode, the gate drive circuit sequentially select the plurality of pixel rows by sequentially applying the first gate-on pulse to the plurality of gate bus lines, and sequentially apply the second gate-on pulse to the plurality of buffer capacitor scanning lines, each of which is associated with the pixel row selected by the first gate-on pulse, during a period that does not overlap a period during which the first gate-on pulse is applied, and the source drive circuit to apply a display signal voltage for normal display to the plurality of source bus lines, and in the stop preparation mode, the gate drive circuit sequentially select the plurality of pixel rows by sequentially applying the first gate-on pulse to the plurality of gate bus lines, and sequentially apply the second gate-on pulse to the plurality of buffer capacitor scanning lines, each of which is associated with the pixel row selected by the first gate-on pulse, during a period that at least partially overlaps a period during which the first gate-on pulse is applied, and the source drive circuit to apply 0 V to the plurality of source bus lines.

Item 15

The control circuit controls the gate drive circuit and the source drive circuit of the liquid crystal display apparatus described in any one of items 2 to 14.

According to an embodiment of the disclosure, there is provided a liquid crystal display apparatus and a driving method thereof that can suppress image sticking when the power is turned off in a liquid crystal display apparatus having a three-TFT structure without increasing power consumption.

BRIEF DESCRIPTION OF DRAWINGS

The disclosure will be described with reference to the accompanying drawings, wherein like numbers reference like elements.

DESCRIPTION OF EMBODIMENTS

Hereinafter, a liquid crystal display apparatus and a driving method thereof according to an embodiment of the disclosure will be described with reference to the accompanying drawings. The liquid crystal display apparatus and the driving method thereof according to the embodiment of the disclosure are not limited to those exemplified below.

Figure 1:
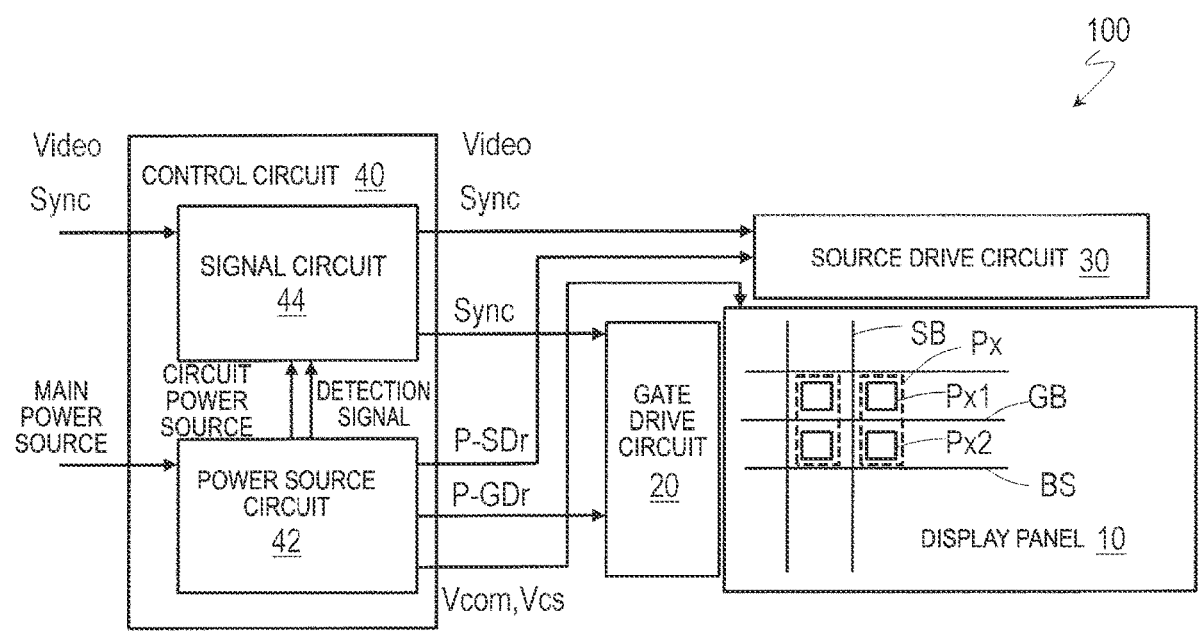
FIG. 1 is a schematic block diagram of a liquid crystal display apparatus 100 according to an embodiment of the disclosure.
Figure 2:
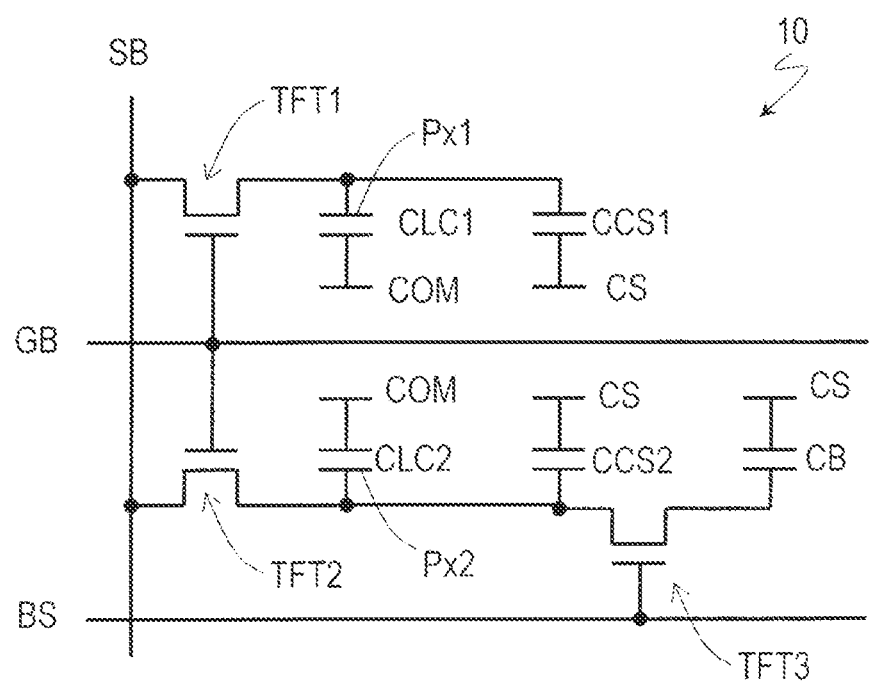
FIG. 2 is a diagram illustrating an equivalent circuit of a three-TFT structure of a display panel 10.

FIG. 1 illustrates a schematic block diagram of a liquid crystal display apparatus 100 according to the embodiment of the disclosure, and FIG. 2 illustrates an equivalent circuit of a three-TFT structure of a display panel 10.

The liquid crystal display apparatus 100 includes a liquid crystal display panel (hereinafter referred to as "display panel") 10, a gate drive circuit 20, a source drive circuit 30, and a control circuit 40. The gate drive circuit 20 and the source drive circuit 30 may be, for example, a plurality of driver ICs, or may be integrally formed in a peripheral region of a TFT substrate included in the display panel 10. In the display panel 10, a region in which a plurality of pixels are arranged is referred to as a display region, and a region around the display region is referred to as a frame region (or a peripheral region).

The display panel 10 includes a plurality of pixels PX arranged in a matrix having a plurality of pixel rows and a plurality of pixel columns, a plurality of gate bus lines GB, each of which is associated with one of the plurality of pixel rows, a plurality of source bus lines SB, each of which is associated with one of the plurality of pixel columns, and a plurality of buffer capacitor scanning lines BS, each of which is associated with one of the plurality of pixel rows.

As illustrated in FIG. 2, each pixel includes a first liquid crystal capacitor CLC1 including a first pixel electrode Px1, a second liquid crystal capacitor CLC2 including a second pixel electrode Px2, a first TFT (TFT1) with a drain electrode connected to the first pixel electrode Px1, a second TFT (TFT2) with a drain electrode connected to the second pixel electrode Px2, and a buffer capacitor CB including a buffer capacitor electrode connected to the second pixel electrode Px2 via a third TFT (TFT3). Gate electrodes of the first TFT and the second TFT included in each pixel are connected to a gate bus line GB associated with a pixel row in which the pixel is included, source electrodes of the first TFT and the second TFT included in each pixel are connected to a source bus line SB associated with a pixel column in which the pixel is included, and a gate electrode of the third TFT included in each pixel is connected to a buffer capacitor scanning line BS associated with a pixel row in which the pixel is included.

Each pixel further includes a first auxiliary capacitor CCS1 including a first auxiliary capacitor electrode electrically connected to the first pixel electrode Px1, and a second auxiliary capacitor CCS2 including a second auxiliary capacitor electrode electrically connected to the second pixel electrode Px2. Here, a buffer capacitor counter electrode constituting the buffer capacitor CB by facing the buffer capacitor electrode with a dielectric layer interposed between the buffer capacitor counter electrode and the buffer capacitor electrode may be electrically connected to a second auxiliary capacitor counter electrode constituting the second auxiliary capacitor by facing the second auxiliary capacitor electrode with a dielectric layer interposed between the second auxiliary capacitor counter electrode and the second auxiliary capacitor electrode.

The gate drive circuit 20 supplies a gate scanning signal GSS including a first gate-on pulse that turns on the first TFT and the second TFT to each of the plurality of gate bus lines GB, and supplies a buffer capacitor scanning signal BSS including a second gate-on pulse that turns on the third TFT to each of the plurality of buffer capacitor scanning lines BS. The source drive circuit 30 supplies a source signal to each of the plurality of source bus lines. The control circuit 40 supplies a power source voltage and a control signal to each of the gate drive circuit 20 and the source drive circuit 30.

As illustrated in FIG. 1, the control circuit 40 includes a power source circuit 42 and a signal circuit 44. The power source circuit 42 is supplied with a main power source voltage from the outside, and the signal circuit 44 is supplied with an image signal (Video) and a synchronization signal (Sync). The power source circuit 42 supplies, to the gate drive circuit (sometimes referred to as "GDr") 20 and the source drive circuit (sometimes referred to as "SDr") 30, corresponding power source voltages (P-GDr and P-SDr) respectively and supplies a common voltage VCOM and an auxiliary capacitor voltage Vcs to the display panel 10. The signal circuit 44 supplies the synchronization signal to each of the gate drive circuit 20 and the source drive circuit 30, and also supplies the image signal to the source drive circuit 30. The synchronization signal, image signal, and the like supplied to the gate drive circuit 20 and the source drive circuit 30 are sometimes collectively referred to as a control signal.

Figure 3:
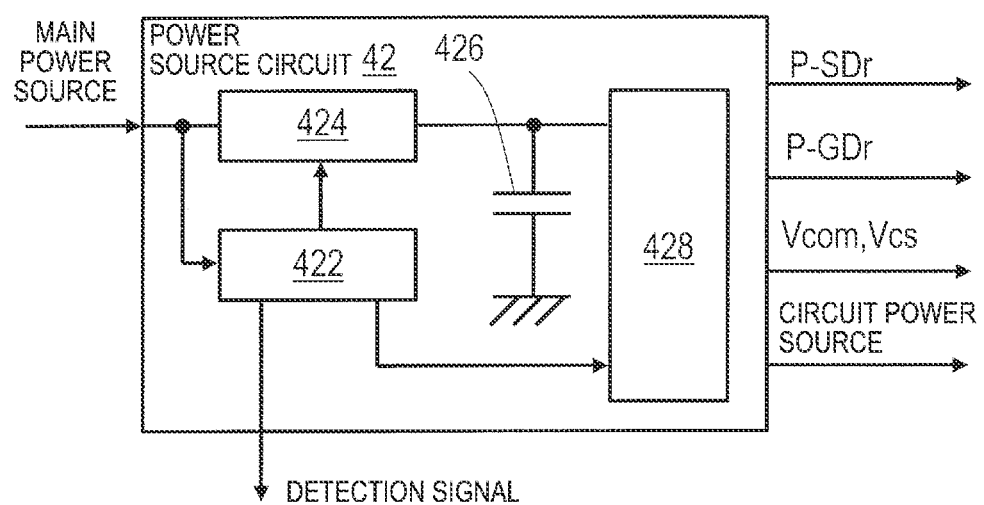
FIG. 3 is a schematic view illustrating a configuration example of a power source circuit 42 included in the liquid crystal display apparatus 100.

The control circuit 40 is configured to switch modes from a display mode in which a normal display is performed to a stop preparation mode when the main power source voltage supplied to the control circuit 40 drops. For example, as illustrated in FIG. 3, the power source circuit 42 includes a detection circuit 422 that generates a detection signal and output the generated detection signal to the signal circuit 44 when the main power source voltage is lower than a predetermined value. The signal circuit 44 is configured to switch modes from the display mode in which the normal display is performed to the stop preparation mode when the signal circuit 44 receives the detection signal.

The power source circuit 42 further includes, for example, a hold capacitor 426 electrically connected to an input terminal of the main power source voltage via a switch 424 and is configured to supply the power source voltage from the hold capacitor 426 to the gate drive circuit 20 in the stop preparation mode. When the main power source is turned off and the main power source voltage drops, the power source circuit 42 detects the drop with the detection circuit 422 and turns off the switch 424 so that the charge of the hold capacitor 426 does not flow back to the external power supply source. Further, when the power source circuit 42 detects a drop in the main power source voltage, the power source circuit 42 drops P-SDr, VCOM, and VCS to the GND level. When P-SDr becomes GND, the output of SDr (source voltage) also becomes the GND level. The circuit power source and the GDr power source are maintained in order to operate the gate drive circuit 20 in the stop preparation mode. Using the charge of the hold capacitor 426, the GND level is written to the pixel electrode of each pixel PX in the stop preparation mode. Note that the charge accumulated and held in the hold capacitor 426 is converted to a predetermined DC voltage via a DC-DC converter 428.

The control circuit 40 controls the gate drive circuit 20 and the source drive circuit 30 to operate as follows.

In the display mode, the gate drive circuit 20 sequentially applies the first gate-on pulse to the plurality of gate bus lines GB so as to sequentially select the plurality of pixel rows and sequentially applies the second gate-on pulse to the plurality of buffer capacitor scanning lines BS. At this time, the second gate-on pulse is applied to a buffer capacitor scanning line BS associated with a pixel row selected by a certain first gate-on pulse during a period that does not overlap a period during which the certain first gate-on pulse is applied. The source drive circuit 30 applies a display signal voltage for normal display to the plurality of source bus lines SB.

In the stop preparation mode, the gate drive circuit 20 sequentially applies the first gate-on pulse to the plurality of gate bus lines GB so as to sequentially select the plurality of pixel rows and sequentially applies the second gate-on pulse to the plurality of buffer capacitor scanning lines BS. At this time, the second gate-on pulse is applied to a buffer capacitor scanning line BS associated with a pixel row selected by a certain first gate-on pulse during a period that at least partially overlaps a period during which the certain first gate-on pulse is applied. The source drive circuit 30 applies 0 V to the plurality of source bus lines SB.

Figure 4:
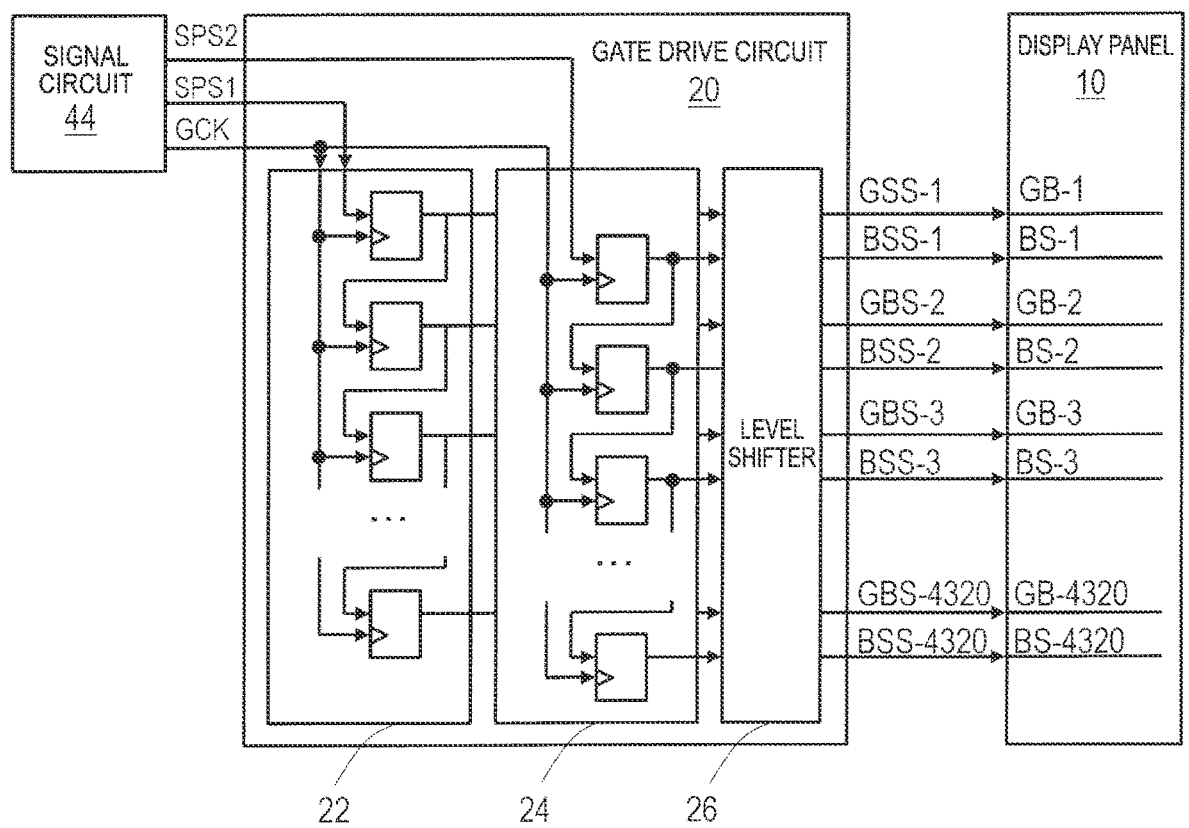
FIG. 4 is a block diagram for explaining an example of a configuration and operation of a gate drive circuit 20.

An example of a configuration and operation of the gate drive circuit 20 will be described with reference to FIG. 4. FIG. 4 is a block diagram for explaining the example of the configuration and operation of the gate drive circuit 20. Here, illustrated is an example in which the gate drive circuit 20 is configured as a driver IC separately from the display panel 10. The gate drive circuit 20 is formed, for example, by cascading a plurality of gate driver ICs (GDr-ICs) in series.

As illustrated in FIG. 4, the gate drive circuit 20 includes a first shift register 22 configured to determine a phase of the first gate-on pulse of the gate scanning signal GSS to be supplied to each of the plurality of gate bus lines GB based on the output of each of the plurality of stages, and a second shift register 24 configured to determine a phase of the second gate-on pulse of the buffer capacitor scanning signal BSS to be supplied to each of the plurality of buffer capacitor scanning lines BS based on the output of each of the plurality of stages.

The signal circuit 44 included in the control circuit 40 supplies common clock signals GCK to the first shift register 22 and the second shift register 24 and supplies a first start pulse signal SPS1 including the first start pulse to the first shift register 22 and supplies a second start pulse signal SPS2 including the second start pulse to the second shift register 24.

By adjusting the interval and the like between the first start pulse signal SPS1 and the second start pulse signal SPS2 in the display mode and the stop preparation mode, respectively, outputs of the gate drive circuit 20 (the gate scanning signal GSS and the buffer capacitor scanning signal BSS) can be set to desired waveforms.

Figure 5:
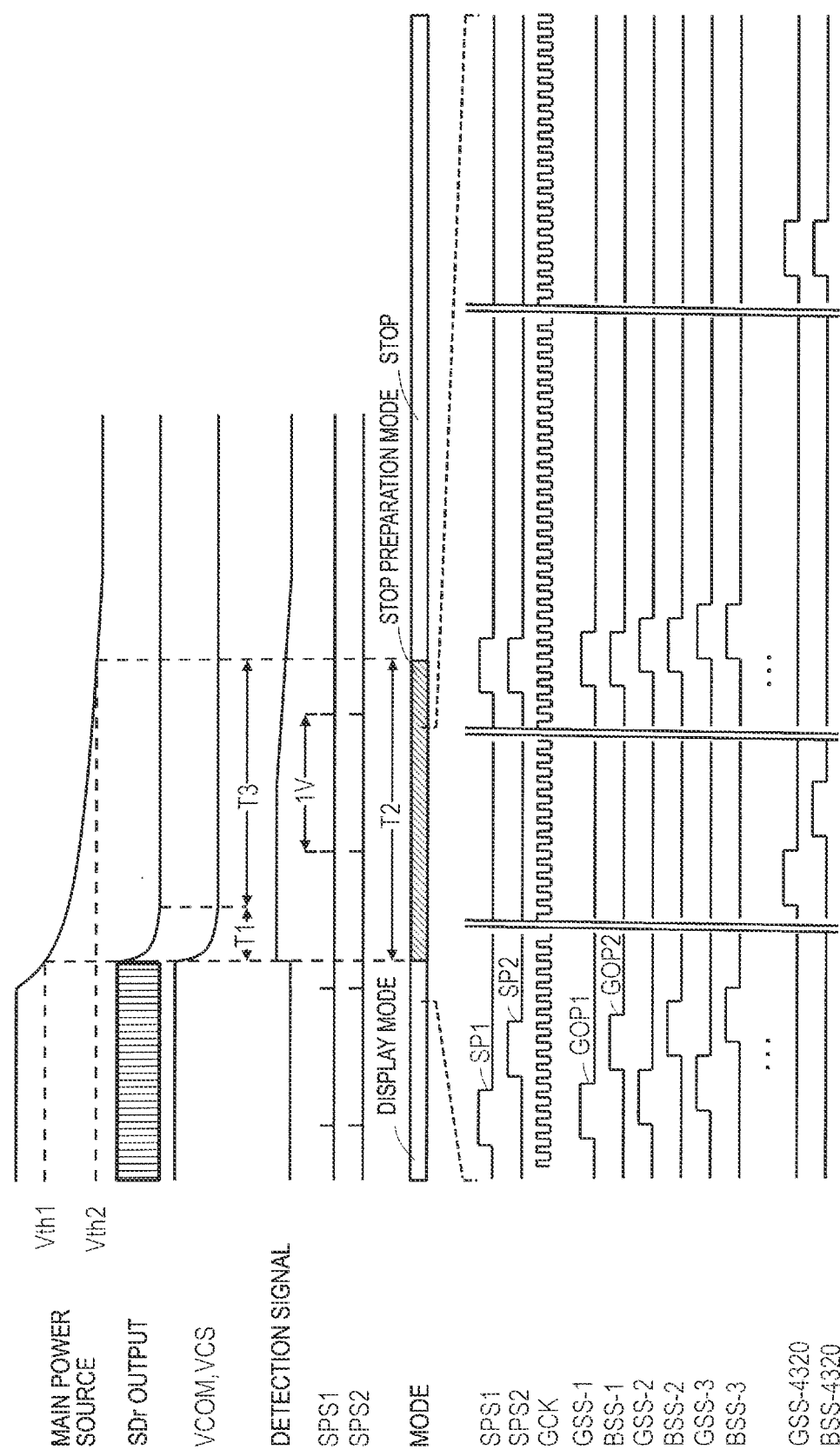
FIG. 5 is a diagram illustrating an example of a time chart of individual signals before and after a main power source of the liquid crystal display apparatus 100 is turned off.

FIG. 5 illustrates an example of a time chart of individual signals before and after the main power source is turned off. In the following figure, 1V means one vertical scanning period. The "vertical scanning period" means a period from the selection of a certain gate bus line GB to the next selection of the certain gate bus line GB. Here, illustrated is an 8K display panel having 4320 pixel rows. 1H means one horizontal scan period and is a period from the selection of a certain first gate bus line GB to the selection of the next gate bus line GB within each vertical scanning period.

The power source circuit 42 outputs a detection signal when the main power source voltage falls Vth1 or less, and when the signal circuit 44 receives the detection signal, the signal circuit 44 shifts from the display mode in which the normal display is performed to the stop preparation mode. Here, a period until the SDr output, VCOM, and VCS drop to the GND level is defined as T1.

First, in the display mode, the control circuit 40 supplies the first start pulse signal SPS1 and the second start pulse signal SPS2 to the gate drive circuit 20 so that the first pixel Px1 and the second pixel Px2 become a bright pixel and a dark pixel, respectively, by the three-TFT structure. For example, within one vertical scanning period, the control circuit 40 applies the first start pulse SP1 to the first shift register 22 and also applies the second start pulse SP2 to the second shift register 24 after a lapse of a first period after applying the first start pulse SP1 to the first shift register 22.

The gate drive circuit 20 sequentially applies the first gate-on pulse GOP1 to the plurality of gate bus lines GB so as to sequentially select the plurality of pixel rows and sequentially applies the second gate-on pulse GOP2 to the plurality of buffer capacitor scanning lines BS. At this time, the second gate-on pulse GOP2 is applied to the buffer capacitor scanning line BS associated with a pixel row selected by a certain first gate-on pulse GOP1 during a period that does not overlap a period during which the certain first gate-on pulse GOP1 is applied. The source drive circuit 30 applies a display signal voltage for normal display to the plurality of source bus lines SB.

Next, in the stop preparation mode, the control circuit 40 supplies the first start pulse signal SPS1 and the second start pulse signal SPS2 to the gate drive circuit 20 so as to quickly discharge the charges in the first pixel Px1 and the second pixel Px2 in the three-TFT structure. For example, within one vertical scanning period, the control circuit 40 applies the first start pulse SP1 to the first shift register 22 and applies the second start pulse SP2 to the second shift register 24 substantially at the same time as the first start pulse SP1 is applied to the first shift register 22 or after a lapse of a second period shorter than the first period. Alternatively, within one vertical scanning period, the control circuit 40 applies the second start pulse SP2 to the second shift register 24 and also applies the first start pulse SP1 to the first shift register 22 substantially at the same time as the second start pulse SP2 is applied to the second shift register 24 or after a lapse of a third period after the second start pulse SP2 is applied to the second shift register 24.

The gate drive circuit 20 sequentially applies the first gate-on pulse GOP1 to the plurality of gate bus lines GB so as to sequentially select the plurality of pixel rows and sequentially applies the second gate-on pulse GOP2 to the plurality of buffer capacitor scanning lines BS. At this time, the second gate-on pulse GOP2 is applied to the buffer capacitor scanning line BS associated with a pixel row selected by a certain first gate-on pulse GOP1 during a period that at least partially overlaps a period during which the certain first gate-on pulse GOP1 is applied. The source drive circuit 30 applies 0 V to the plurality of source bus lines SB.

In FIG. 5, in the stop preparation mode, the first start pulse SP1 of the first start pulse signal SPS1 and the second start pulse SP2 of the second start pulse signal SPS2 have the same waveform but may have slightly different waveforms from each other. For example, depending on the circuit design of the gate drive circuit 20, a phase difference between the first start pulse signal SPS1 and the gate scanning signal GSS-1 may be different from a phase difference between the second start pulse signal SPS2 and the buffer capacitor scanning signal BSS-1. In this case, a phase difference may be provided between the first start pulse signal SPS1 and the second start pulse signal SPS2 so that the gate scanning signal GSS-1 and the buffer capacitor scanning signal BSS-1 have the same waveform. The second gate-on pulse GOP2 and the first gate-on pulse GOP1 need not have exactly the same waveform, and it is sufficient that the second gate-on pulse GOP2 is applied during a period that at least partially overlaps the period during which the first gate-on pulse GOP1 is applied.

Figure 6:
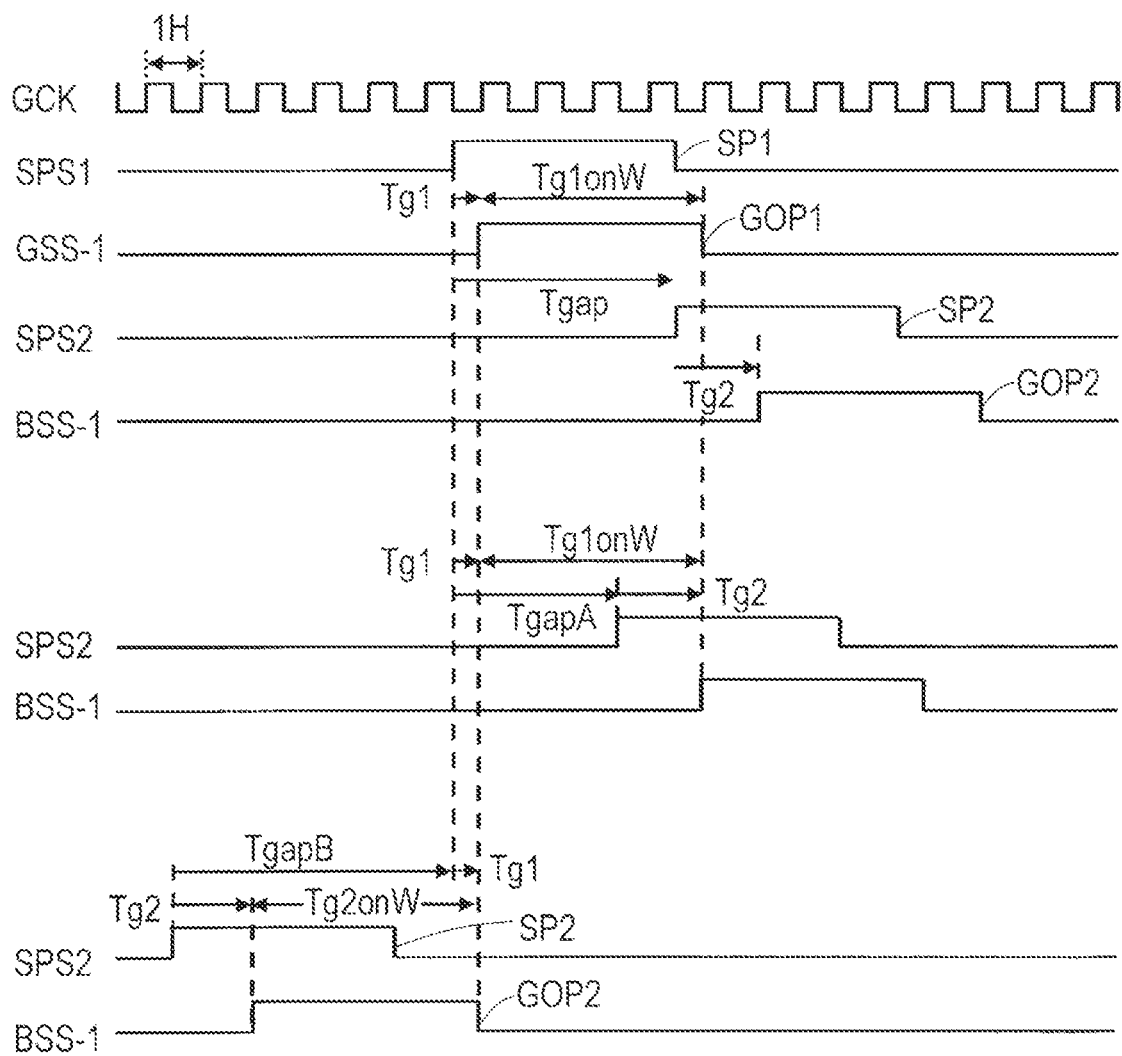
FIG. 6 is a time chart illustrating a relationship between a first start pulse SP1, a second start pulse SP2, a first gate-on pulse GOP1, and a second gate-on pulse GOP2.

Here, FIG. 6 is referred. FIG. 6 is a time chart illustrating a relationship between the first start pulse SP1, the second start pulse SP2, the first gate-on pulse GOP1, and the second gate-on pulse GOP2.

TgapA=Tg1$on$W−(Tg2−Tg1) and TgapB=Tg2$on$W−(Tg1−Tg2), and the first period is longer than TgapA, the second period is the same as or shorter than TgapA, and the third period is the same as or shorter than TgapB, where a period from a rise of the first start pulse SP1 to a rise of the first gate-on pulse GOP1 is Tg1, a period from a rise of the second start pulse SP2 to a rise of the second gate-on pulse GOP2 is Tg2, a width of the first gate-on pulse GOP1 is Tg1$on$W, a width of the second gate-on pulse GOP2 is Tg2$on$W, a period from the rise of the first start pulse SP1 to the rise of the second start pulse SP2 when a fall of the first gate-on pulse GOP1 and the rise of the second gate-on pulse GOP2 coincide with each other is TgapA, a period from the rise of the second start pulse SP2 to the rise of the first start pulse SP1 when a fall of the second gate-on pulse GOP2 and the rise of the first gate-on pulse GOP1 coincide with each other is TgapB. Tg1 is, for example, 0H, and Tg2 is, for example, 1H.

Here, the condition that the first gate-on pulse GOP1 and the second gate-on pulse GOP2 do not overlap is Tgap+Tg2>Tg1+Tg1$on$W. The condition that the first gate-on pulse GOP1 and the second gate-on pulse GOP2 at least partially overlap is Tgap+Tg2≤Tg1+Tg1$on$W, that is, Tgap≤Tg1$on$W−(Tg2−Tg1) when the first start pulse SP1 rises before the second start pulse SP2, and Tgap+Tg1≤Tg2+Tg2$on$W, that is, Tgap≤Tg2$on$W−(Tg1−Tg2) when the second start pulse SP2 rises before the first start pulse SP1.

The voltage at which the main power source voltage drops further, and the stop preparation mode cannot be operated is defined as Vth2. A period from Vth1 to Vth2 of the main power source voltage is a period T2 for operating in the stop preparation mode. The period T2 is mainly determined by the capacitance value of the hold capacitor 426 and the power required to operate in the stop preparation mode.

Here, a period from the end of T1 to the end of T2 is T3. In the liquid crystal display apparatus 100 according to the embodiment of the disclosure, in order to discharge the charges of all pixels and bring the potentials of the first pixel electrodes and the second pixel electrodes to the GND level, it is only necessary to scan all the gate bus lines GB and all the buffer capacitor scanning lines BS of the display panel 10 at least once during the period T3. That is, at a minimum, all the gate bus lines GB, and all the buffer capacitor scanning lines BS can be scanned in one vertical scanning period. However, in actual use, the timing at which the main power source is turned off may vary. In the worst case, one vertical scanning period can be from when the main power source is turned off to when the first start pulse SP1 rises. Thus, the period T3 is required for at least two vertical scanning periods. It is preferable to secure the capacitance value of the hold capacitor 426 so that operation in the stop preparation mode can be performed during this period.

Figure 7:
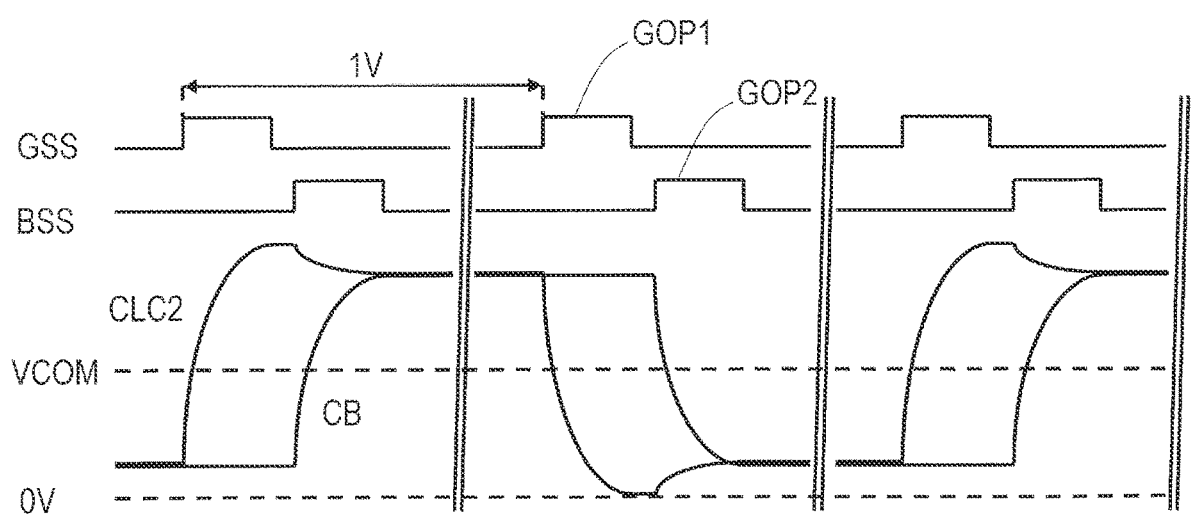
FIG. 7 is a time chart illustrating a change in a voltage of a second liquid crystal capacitor CLC2 (dark pixel) in a display mode.
Figure 8:
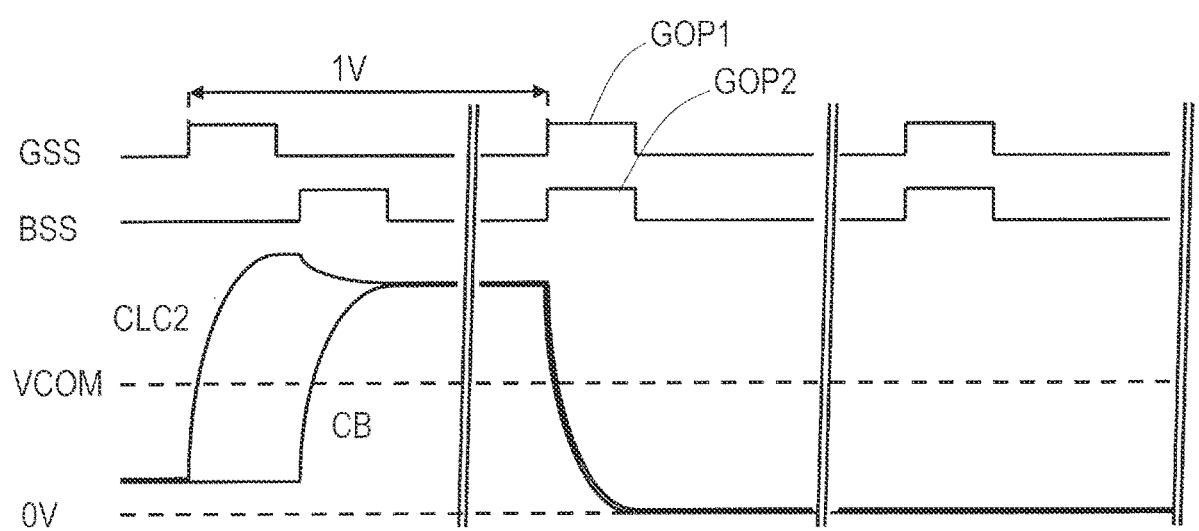
FIG. 8 is a time chart illustrating a change in a voltage of the second liquid crystal capacitor CLC2 (dark pixel) of a liquid crystal display apparatus according to the embodiment of the disclosure in a stop preparation mode.
Figure 9:
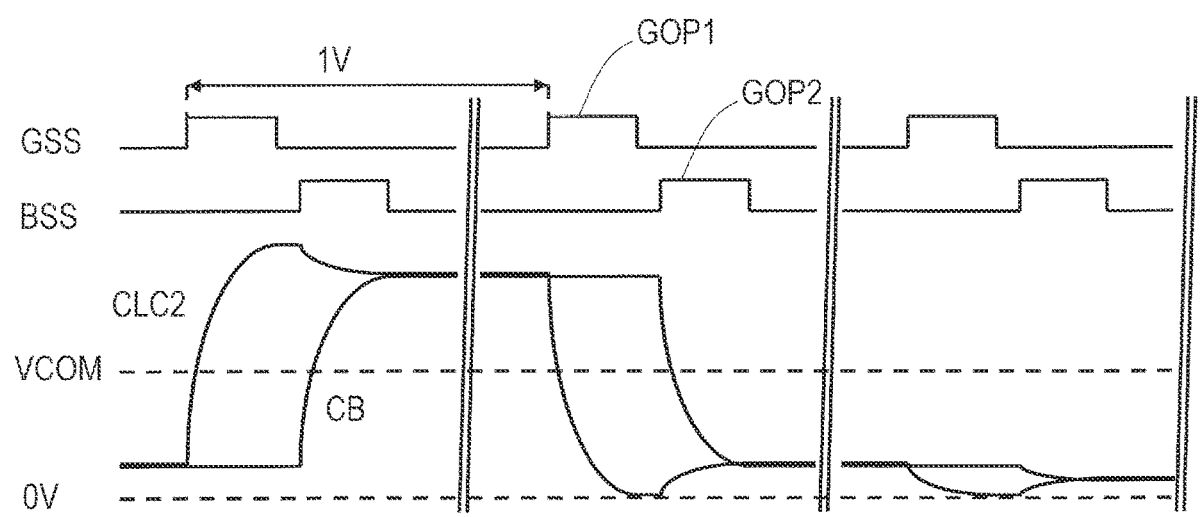
FIG. 9 is a time chart illustrating a change in a voltage of a second liquid crystal capacitor CLC2 (dark pixel) of a liquid crystal display apparatus according to a comparative example in a stop preparation mode.

Next, with reference to FIGS. 7 to 9, a change in a voltage of the second liquid crystal capacitor CLC2 (dark pixel) will be described. FIG. 7 is a time chart illustrating a change in a voltage of the second liquid crystal capacitor CLC2 (dark pixel) in the display mode, and FIG. 8 is a time chart illustrating a change in a voltage of the second liquid crystal capacitor CLC2 (dark pixel) of the liquid crystal display apparatus according to the embodiment of the disclosure in the stop preparation mode. FIG. 9 is a time chart illustrating a change in a voltage of the second liquid crystal capacitor CLC2 (dark pixel) of the liquid crystal display apparatus according to a comparative example in the stop preparation mode.

As illustrated in FIG. 7, in the normal display mode, the control circuit 40 applies a predetermined display signal voltage to the first liquid crystal capacitor CLC1 (bright pixel) and the second liquid crystal capacitor CLC2 (dark pixel) by turning on the first TFT and the second TFT with the first gate-on pulse GOP1. After the first gate-on pulse GOP1 falls, that is, the first TFT is turned off, the third TFT is turned on with the second gate-on pulse GOP2, and the charge is shared between the second liquid crystal capacitor CLC2 (dark pixel) and the buffer capacitor CB. This operation is performed sequentially. The polarity of the display signal voltage is inverted for each vertical scanning period (sometimes referred to as "one frame inversion"), and the polarities of the voltage of the second liquid crystal capacitor CLC2 (dark pixel) immediately before the third TFT is turned on with the second gate-on pulse GOP2 and the voltage of the buffer capacitor CB are opposite to each other, and thus the voltage of the second liquid crystal capacitor CLC2 decreases (changes in a direction approaching the common voltage VCOM) due to the charge share. Here, the voltage of the second liquid crystal capacitor CLC2 (dark pixel), the voltage of the buffer capacitor CB, and the like mean the voltages based on the common voltage VCOM.

In the stop preparation mode of the liquid crystal display apparatus according to the embodiment of the disclosure, the voltage of the second liquid crystal capacitor CLC2 (dark pixel) is illustrated in FIG. 8. By applying the first gate-on pulse GOP1 and the second gate-on pulse GOP2 simultaneously, the first, second, and third TFTs are turned on simultaneously, so that a source voltage of 0 V can be applied directly from the source bus line SB not only to the first liquid crystal capacitor CLC1 (bright pixel) but also to the second liquid crystal capacitor CLC2 (dark pixel) and the buffer capacitor CB. Thus, the second liquid crystal capacitor CLC2 (dark pixel) can be set to 0 V in one vertical scanning period. The voltage of the second liquid crystal capacitor CLC2 (dark pixel) is held at 0 V without fluctuating thereafter. At this time, the number of gate bus lines GB and the number of buffer capacitor scanning lines BS to which the first gate-on pulses GOP1 and the second gate-on pulses GOP2 are applied simultaneously are the same or about the same as in the display mode, so that the power consumption does not increase as in the technique described in JP 2008-170995 A. Note that a similar effect can be obtained even when the period during which the first gate-on pulse GOP1 is applied and the period during which the second gate-on pulse GOP2 is applied partially overlap.

In contrast, in the stop preparation mode of the liquid crystal display apparatus according to the comparative example illustrated in FIG. 9, for example, by turning off the source drive circuit and the VCOM generation circuit, the source voltage and the VCOM voltage are set to 0 V. The gate drive circuit is operated in the similar manner to the normal display mode while maintaining the power sources to the gate drive circuit and the control circuit that controls the gate drive circuit. After the lapse of the time required to apply 0 V to all pixels, all power sources are turned off. Since the charge share is performed here between the second liquid crystal capacitor CLC2 (dark pixel) and the buffer capacitor CB, it takes a relatively long time for the voltages of all pixels to reach 0 V.

Figure 10:
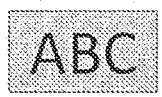
FIG. 10 is a chart for explaining an effect of the liquid crystal display apparatus (Case 3) according to the embodiment of the disclosure.

Next, FIG. 10 is referred. FIG. 10 is a chart for explaining an effect of the liquid crystal display apparatus (Case 3) according to the embodiment of the disclosure. The chart is a summary comparing the cost and the presence or absence of display image sticking for various combinations of the implementation or non-implementation of the disclosure and the large or small capacitance value of the hold capacitor.

Here, the following common conditions were set. The display panel has a three-TFT structure, and each TFT is an oxide semiconductor (In—Ga—Zn—O semiconductor) TFT.

In order to avoid display image sticking without implementing the disclosure, the period T3 in the stop preparation mode requires eight vertical scanning periods.

When the capacitance value of the hold capacitor 426 is "small", the period T3 that can be ensured in the stop preparation mode is two or three vertical scanning periods.

When the capacitance value of the hold capacitor 426 is "large", the period T3 that can be ensured in the stop preparation mode is eight or nine vertical scanning periods.

In Case 1, the cost is low because the capacitance value of the hold capacitor 426 is "small", but the period T3 that can be ensured (two or three vertical scanning periods) is shorter than the required period T3 (eight vertical scanning periods), so the image sticking may occur.

In Case 2, the period T3 that can be ensured (eight or nine vertical scanning periods) is longer than the required period T3 (eight vertical scanning periods), the image sticking is not likely to occur, but the capacitance value of the hold capacitor 426 is "large", so the cost is high.

In Case 3 to which the disclosure is applied, the period T3 that can be ensured (two or three vertical scanning periods) is longer than the required period T3 (two vertical scanning periods), so the image sticking is not likely to occur, and the capacitance value of the hold capacitor 426 is "small", so the cost is low.

Next, a liquid crystal display apparatus and a driving method thereof according to another embodiment of the disclosure will be described. The liquid crystal display apparatus described here is a so-called Gate on Array (GOA) liquid crystal display apparatus in which the gate drive circuit 20 is integrally formed in the display panel 10. The overall configuration of the GOA liquid crystal display apparatus may be basically the same as that of the liquid crystal display apparatus 100 described above. For example, the power source circuit 42 has the structure illustrated in FIG. 3 and outputs a detection signal to the signal circuit 44 when the power source circuit 42 detects a drop in the main power source voltage.

Figure 11:
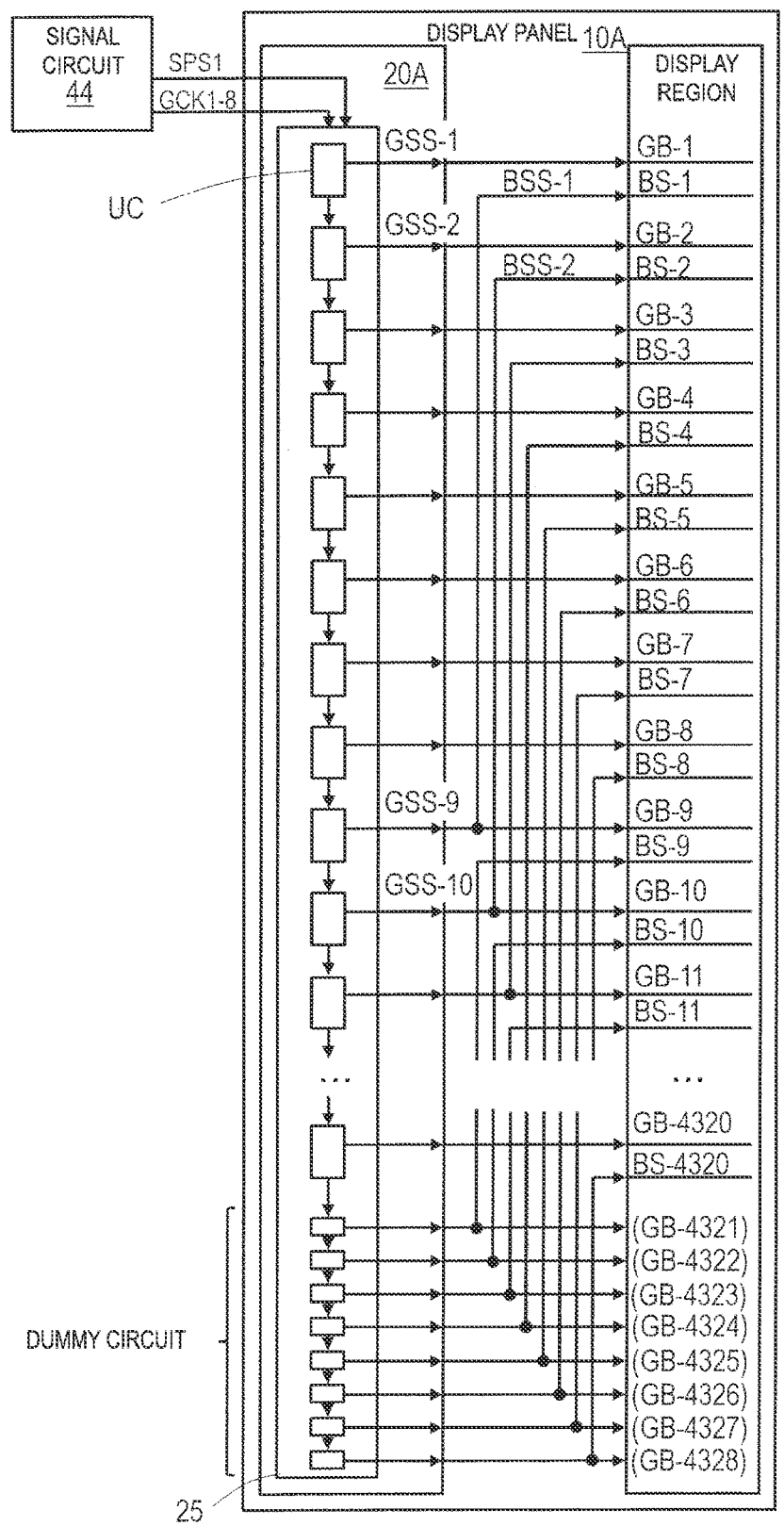
FIG. 11 is a block diagram for explaining an example of a configuration and operation of a gate drive circuit 20A included in a GOA liquid crystal display apparatus according to an embodiment of the disclosure.
Figure 12:
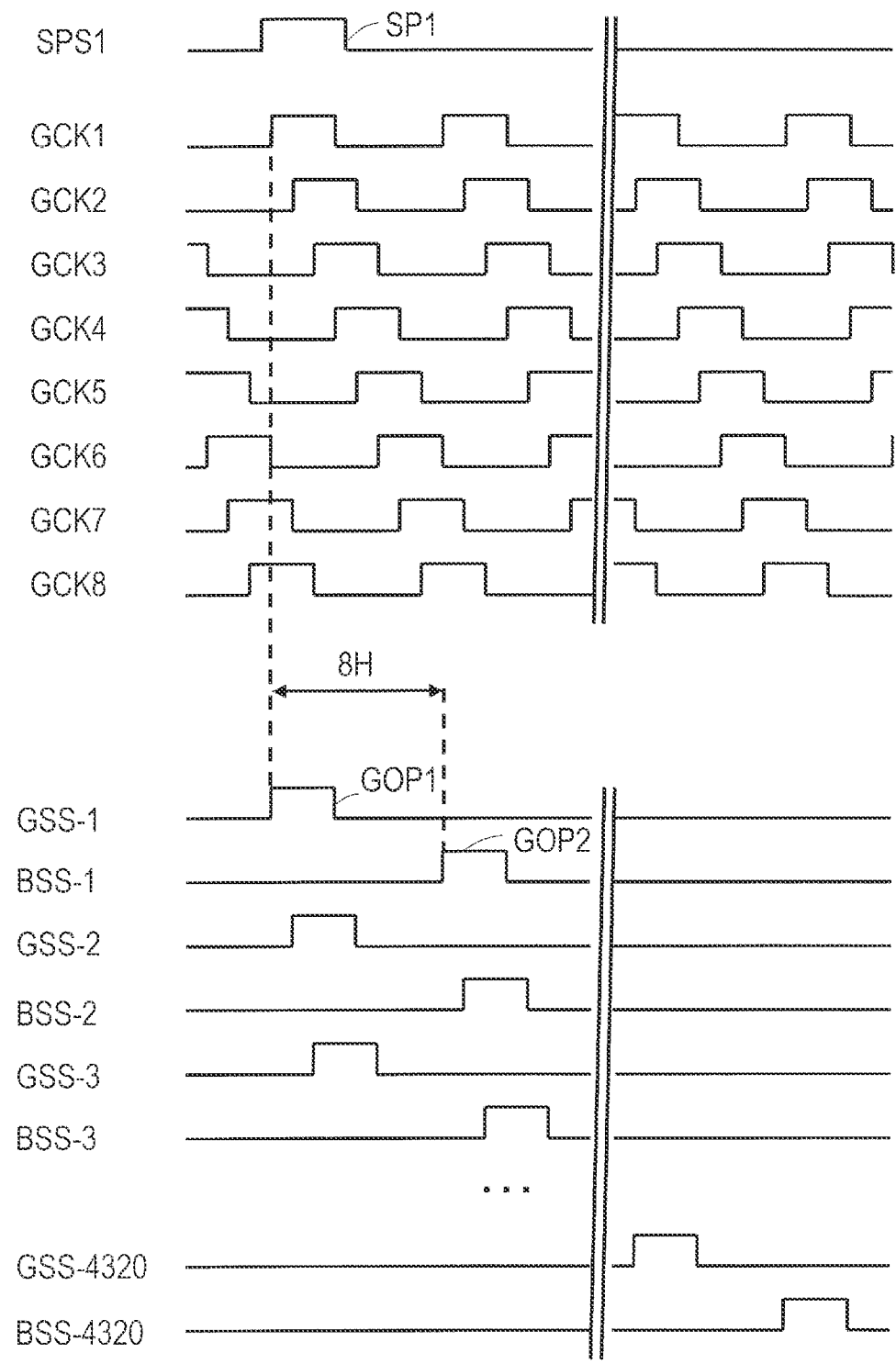
FIG. 12 is a diagram illustrating a time chart of a start pulse signal SPS1, gate clocks GCK1 to GCK8, a gate scanning signal GSS, and a buffer capacitor scanning signal BSS in the GOA liquid crystal display apparatus according to the embodiment of the disclosure in a display mode.

FIG. 11 illustrates a block diagram for explaining an example of a configuration and operation of a gate drive circuit 20A formed in a display panel 10A. FIG. 12 illustrates a time chart of the start pulse signal SPS1, the gate clocks GCK1 to GCK8, the gate scanning signal GSS, and the buffer capacitor scanning signal BSS.

In the GOA liquid crystal display apparatus, since the gate drive circuit 20A is formed using the TFTs, general shift registers and a level shifter as illustrated in FIG. 4 cannot be used. It is very difficult to implement the level shifter with TFTs, so a level shifter is provided in the signal circuit 44 of the control circuit 40. The signal circuit 44 supplies the first start pulse signal SPS1 and eight types of gate clocks GCK1 to GCK8 to the gate drive circuit 20A. As illustrated in FIG. 12, the gate clocks GCK1 to GCK8 have waveforms having a cycle of 8H and different phases by 1H. The number of types of gate clocks having different phases from each other is referred to as a phase number, and here, "eight phases" is exemplified. The GOA liquid crystal display apparatus has a limit on the minimum value of the pulse interval to be generated, and in the case of eight phases, basically only a waveform with eight lines±two lines as the minimum unit may be output. The number of this minimum unit depends on the design of the GOA. The configuration of the shift register using the TFTs is well known and will not be described here.

As illustrated in FIG. 11, the gate drive circuit 20A has a simple structure with only one shift register 25. This suppresses an increase in the frame region (peripheral region) of the display panel 10A. The unit circuit constituting each stage of the shift register 25 includes at least one TFT.

A method of controlling the gate scanning signal GSS and the buffer capacitor scanning signal BSS in the display mode in which normal display is performed using the one shift register 25 will be described. The numbers (1 to 4328) after the gate bus lines GB, the buffer capacitor scanning lines BS, the gate scanning signals GSS, and the buffer capacitor scanning signals BSS indicate the numbers of the gate bus lines GB and the buffer capacitor scanning lines BS, and are numbered from 1 corresponding to the top pixel row to 4320 corresponding to the bottom pixel row of the display region. 4321 and subsequent numbers correspond to dummy circuits that do not contribute to display.

First, the shift register is configured to output the gate scanning signal GSS, and the shift register is connected to the gate bus line GB. Next, the shift register is connected to the buffer capacitor scanning line BS so that the same signal as the gate bus line GB "n lines ahead" is supplied. In the display mode, the second gate-on pulse GOP2 of the buffer capacitor scanning signal BSS has the same waveform as the first gate-on pulse GOP1 of the gate scanning signal GSS, and only needs to be different in phase, so the shift register can be connected in this way. Here, in order to turn on the gate bus line GB-1 and the buffer capacitor scanning line BS-1 at the same time, n in "n lines ahead" is set to be equal to or greater than the minimum value of the pulse interval that can be generated by the gate drive circuit 20A. Since the example illustrated in FIG. 11 has eight phases, a case where the minimum value is eight will be described. The buffer capacitor scanning line BS-1 is connected so that the same signal GSS-9 supplied to the gate bus line GB-9 eight lines ahead is supplied. That is, the buffer capacitor scanning signal BSS-1 is the same signal as the gate scanning signal GSS-9. Similarly, the buffer capacitor scanning line BS-2 is connected so that the same signal supplied to the gate bus line GB-10 is supplied to the buffer capacitor scanning line BS-2, and the same applies to the buffer capacitor scanning line BS-3 and subsequent lines.

Thus, the time chart of the start pulse signal SPS1, the gate clocks GCK1 to GCK8, the gate scanning signal GSS, and the buffer capacitor scanning signal BSS in the GOA liquid crystal display apparatus according to the embodiment of the disclosure in the display mode is illustrated in FIG. 12.

Figure 13:
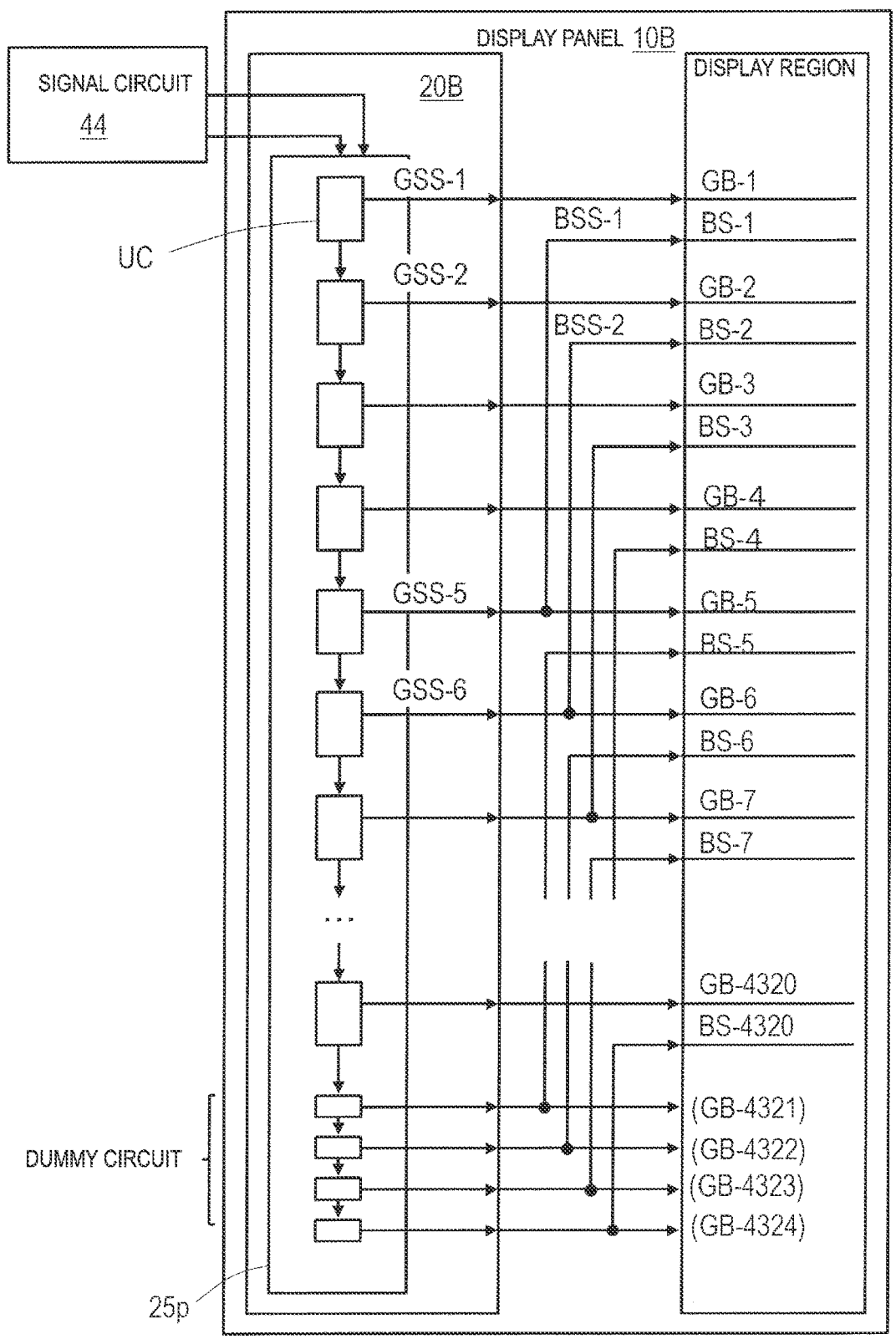
FIG. 13 is a block diagram for explaining an example of a configuration and operation of a gate drive circuit 20B included in a GOA liquid crystal display apparatus according to a comparative example.
Figure 14:
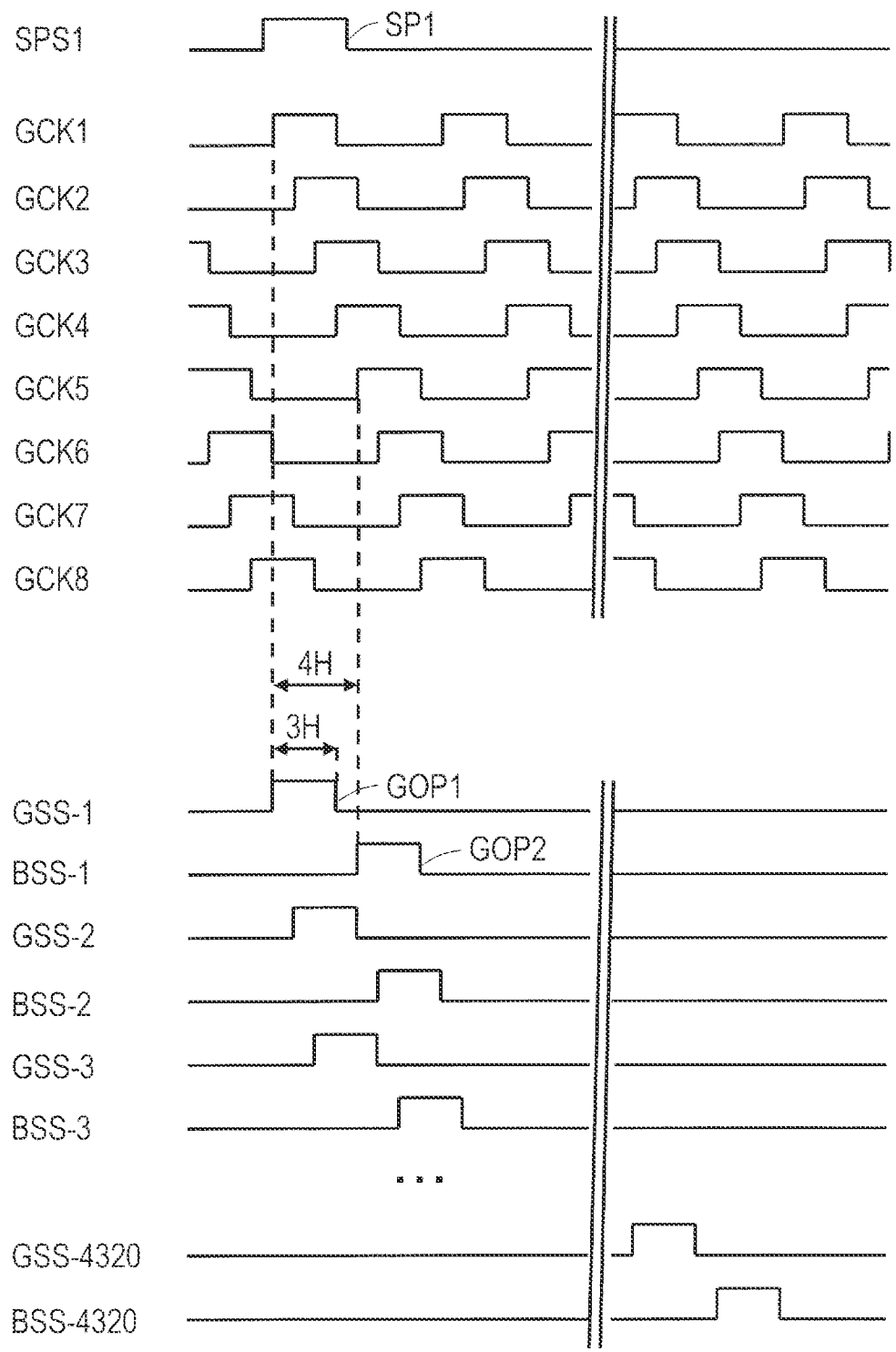
FIG. 14 is a diagram illustrating a time chart of a start pulse signal SPS1, gate clocks GCK1 to GCK8, a gate scanning signal GSS, and a buffer capacitor scanning signal BSS in a display mode in the GOA liquid crystal display apparatus according to the comparative example.

Referring now to FIGS. 13 and 14, a configuration and operation of a GOA gate drive circuit 20B that drives a liquid crystal display apparatus having a three-TFT structure using a known driving method will be described. FIG. 13 is a block diagram for explaining an example of the configuration and operation of the gate drive circuit 20B included in a display panel 10B of the GOA liquid crystal display apparatus according to the comparative example. FIG. 14 is a diagram illustrating a time chart of the start pulse signal SPS1, the gate clocks GCK1 to GCK8, the gate scanning signal GSS, and the buffer capacitor scanning signal BSS in the GOA liquid crystal display apparatus according to the comparative example in the display mode.

In the known driving method, the gate bus line GB and the buffer capacitor scanning line BS associated with the same pixel row are not turned on simultaneously. That is, in the display mode in which the normal display is performed, after the gate bus line GB (e.g., GB-1) is turned off, the buffer capacitor scanning line BS (e.g., BS-1) is turned on.

On the other hand, when n in "n lines ahead" described above is large, the dummy circuit of the GOA gate drive circuit becomes large, so it is preferable to keep n as small as possible. Thus, for example, when the number of phases is eight and the ratio H:L of the high level period and the low level period of the clock is 3:5, the buffer capacitor scanning line BS is connected to the gate bus line GB four lines ahead with n as four, as the GOA drive circuit 20B of the display panel 10B illustrated in FIG. 13. At this time, the time chart of the start pulse signal SPS1, the gate clocks GCK1 to GCK8, the gate scanning signal GSS, and the buffer capacitor scanning signal BSS is illustrated in FIG. 14.

Note that in FIGS. 12 and 14, and FIG. 15 explained below, the delay from the first start pulse SP1 to the first gate-on pulse GOP1 of the first gate bus line GB-1 is indicated as approximately zero lines, but the delay may be several lines (several H). In the GOA liquid crystal display apparatus, delay is likely to occur, so it is preferable to design with a margin of several lines (several H).

Figure 15:
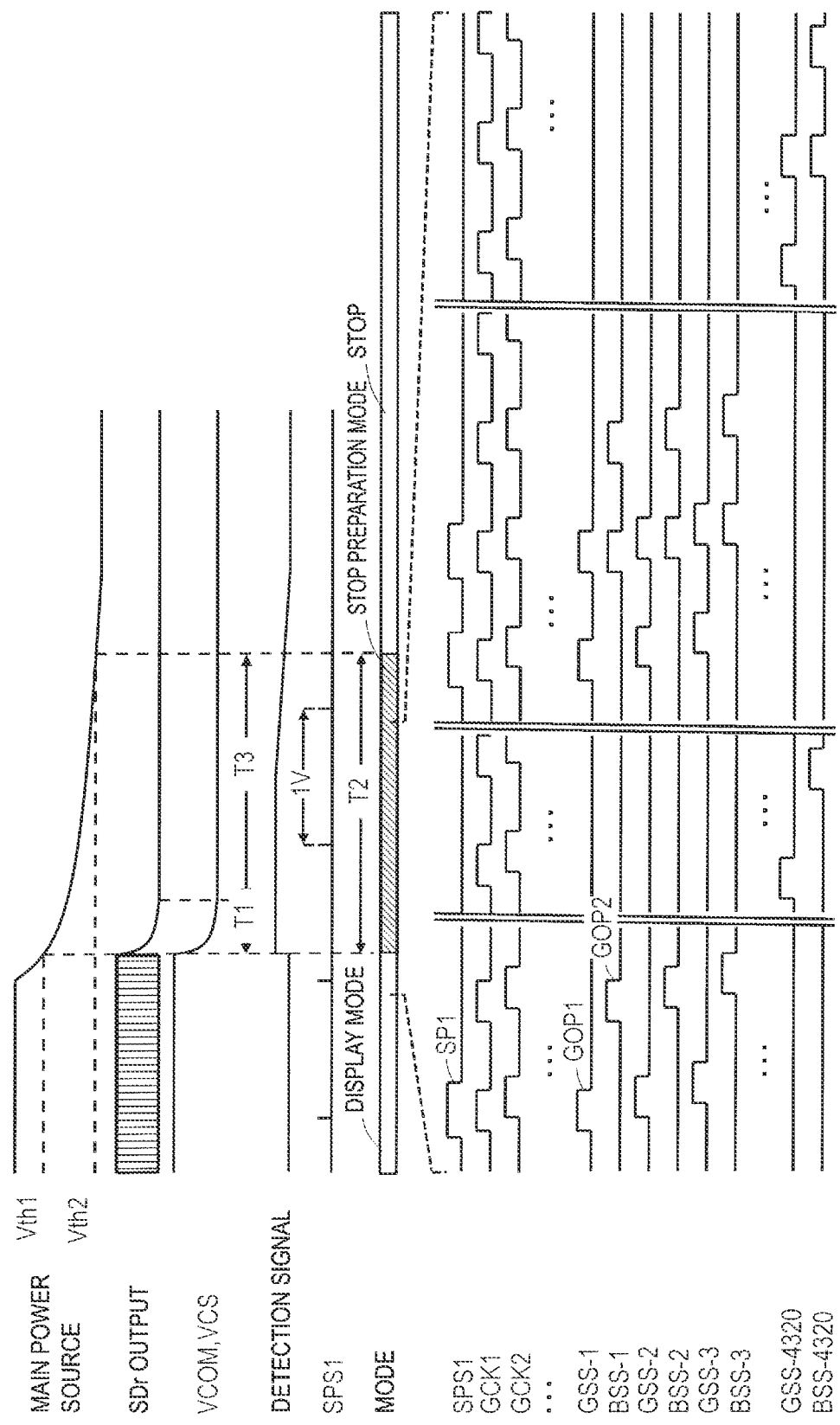
FIG. 15 is a diagram illustrating an example of a time chart of individual signals before and after a main power source of the GOA liquid crystal display apparatus according to the embodiment of the disclosure is turned off.

Next, FIG. 15 illustrates an example of a time chart of individual signals before and after the main power source of the GOA liquid crystal display apparatus according to the embodiment of the disclosure is turned off.

The GOA liquid crystal display apparatus is the same as the liquid crystal display apparatus using the gate driver IC according to the embodiment described above in that the signal circuit 44 switches to the stop preparation mode when the signal circuit 44 receives a detection signal from the control circuit 40 (power source circuit 42).

In the GOA liquid crystal display apparatus according to the embodiment of the disclosure, the output of the gate drive circuit 20A is set to a desired waveform by changing the waveform of the start pulse signal SPS1 (start pulse SP1) in the display mode and the stop preparation mode.

In the display mode, as illustrated in FIG. 12, the control circuit 40 applies the start pulse SP1 to the shift register 25 only once within one vertical scanning period. In other words, the start pulse signal SPS1 supplied to the shift register 25 goes into the high state (H) only once within one vertical scanning period. At this time, the gate drive circuit 20A applies the first gate-on pulse GOP1 only once to each of the plurality of gate bus lines GB within one vertical scanning period. The buffer capacitor scanning line BS associated with the pixel row selected by the first gate-on pulse GOP1 is applied with the first gate-on pulse to be applied to the gate bus line GB n lines ahead. Thus, the second gate-on pulse (the first gate-on pulse to be applied to the gate bus line GB n lines ahead) is applied to the buffer capacitor scanning line during a period that does not overlap the period in which the first gate-on pulse is applied. This operation is performed sequentially. In this manner, the second pixel (second liquid crystal capacitor CLC2) is made a dark pixel by the charge share.

On the other hand, in the stop preparation mode, as illustrated in FIG. 15, the control circuit 40 applies the start pulse SP1 to the shift register 25 twice or more within one vertical scanning period. Then, the gate drive circuit 20A applies the first gate-on pulse GOP1 two or more times to each of the plurality of gate bus lines GB and the second gate-on pulse GOP2 two or more times to each of the plurality of buffer capacitor scanning lines BS within one vertical scanning period and applies a first instance of the second gate-on pulse GOP2 to the buffer capacitor scanning line BS associated with a pixel row selected by a second instance of the first gate-on pulse GOP1. That is, when the second instance of the first gate-on pulse GOP1 is applied to a certain gate bus line GB, the first gate-on pulse GOP1 to be applied to the gate bus line GB n lines ahead (the first instance of the second gate-on pulse GOP2) is simultaneously applied to the buffer capacitor scanning line BS associated with the same pixel row as the certain gate bus line GB. As a result, the first, second, and third TFTs are turned on simultaneously, and the source voltage of 0 V is applied directly from the source bus line SB not only to the first liquid crystal capacitor CLC1 (bright pixel) but also to the second liquid crystal capacitor CLC2 (dark pixel) and the buffer capacitor CB, so that the second liquid crystal capacitor CLC2 (dark pixel) can be made 0 V during one vertical scanning period and the voltage in the second liquid crystal capacitor CLC2 (dark pixel) is held at 0 V without fluctuation. Note that a timing of applying the second instance of the first gate-on pulse GOP1 (i.e., timing of applying the second start pulse SP1) and/or the value of n may be set so that the period during which the second instance of the first gate-on pulse GOP1 is applied overlaps, at least partially, the period during which the first gate-on pulse GOP1 (the first instance of the second gate-on pulse GOP2) to be applied to the gate bus line GB n lines ahead is applied. The similar effect can be obtained even when the period during which the first gate-on pulse GOP1 is applied and the period during which the second gate-on pulse GOP2 is applied partially overlap. After this, the second gate-on pulse GOP2 is applied to the buffer capacitor scanning line BS, but this is merely a redundant operation and there is no problem. Note that in the stop preparation mode, the source drive circuit applies 0 V to the plurality of source bus lines SB. Note that the periods T1, T2, T3, and the like in FIG. 15 are the same as those in FIG. 5, and thus descriptions thereof will be omitted here.

Here, although the GOA gate drive circuit 20A with eight phases where n is eight is illustrated, the GOA liquid crystal display apparatus is not limited thereto as long as the following requirements are satisfied.

The buffer capacitor scanning line BS associated with a certain pixel row is electrically connected to the gate bus line GB associated with the pixel row n rows away from the certain pixel row, where n is an integer from 1 to 4 when m=2, and n is an integer from m−2 to m+2 when m≠2. The gate drive circuit includes the shift register configured to determine the phase of the first gate-on pulse GOP1 of the gate scanning signal GSS to be supplied to each of the plurality of gate bus lines GB and the phase of the second gate-on pulse GOP2 of the buffer capacitor scanning signal BSS to be supplied to each of the plurality of buffer capacitor scanning lines BS based on the output of each of the plurality of stages. The control circuit 40 supplies the shift register 25 with m types of clock signals (m is an integer of 2 or greater) with different phases from each other, as well as the start pulse signal SPS1 including the start pulse SP1. The control circuit applies the start pulse SP1 to the shift register 25 two or more times within one vertical scanning period in the stop preparation mode. Here, the cycle of the m types of clock signals is preferably three times or more (3H or more) than one horizontal scan period (1H).

In the liquid crystal display apparatus according to the embodiment of the disclosure, the image sticking when the power is turned off can be suppressed without increasing power consumption. The liquid crystal display apparatus according to the embodiment of the disclosure is suitable for large and high resolution (e.g., 90-inch and 8K) liquid crystal display apparatus, for example, that uses oxide semiconductor TFTs as pixel TFTs. The oxide semiconductor TFT is described in, for example, JP 2014-007399 A. The entire contents of the disclosure of JP 2014-007399 A are incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display apparatus comprising:
a plurality of pixels arranged in a matrix having a plurality of pixel rows and a plurality of pixel columns;
a plurality of gate bus lines, each of which is associated with one of the plurality of pixel rows;
a plurality of source bus lines, each of which is associated with one of the plurality of pixel columns; and
a plurality of buffer capacitor scanning lines, each of which is associated with one of the plurality of pixel rows,
wherein each of the plurality of pixels includes
a first liquid crystal capacitor including a first pixel electrode,
a second liquid crystal capacitor including a second pixel electrode,
a first TFT with a drain electrode connected to the first pixel electrode,
a second TFT with a drain electrode connected to the second pixel electrode, and
a buffer capacitor including a buffer capacitor electrode connected to the second pixel electrode via a third TFT,
gate electrodes of the first TFT and the second TFT of each pixel of the plurality of pixels are connected to a gate bus line associated with a pixel row including the pixel,
source electrodes of the first TFT and the second TFT of each pixel of the plurality of pixels are connected to a source bus line associated with a pixel column including the pixel,
a gate electrode of the third TFT of each pixel of the plurality of pixels is connected to a buffer capacitor scanning line associated with a pixel row including the pixel,
the liquid crystal display apparatus further includes
a gate drive circuit configured to supply a gate scanning signal including a first gate-on pulse configured to turn on the first TFT and the second TFT to each of the plurality of gate bus lines, and a buffer capacitor scanning signal including a second gate-on pulse configured to turn on the third TFT to each of the plurality of buffer capacitor scanning lines, a source drive circuit configured to supply a source signal to each of the plurality of source bus lines, and a control circuit configured to supply a power source voltage and a control signal to each of the gate drive circuit and the source drive circuit, and the control circuit is configured to switch modes from a display mode for normal display to a stop preparation mode in a case that a main power source voltage supplied to the control circuit drops, and control the gate drive circuit and the source drive circuit to cause in the display mode, the gate drive circuit to sequentially select the plurality of pixel rows by sequentially applying the first gate-on pulse to the plurality of gate bus lines, and sequentially apply the second gate-on pulse to the plurality of buffer capacitor scanning lines, each of which is associated with the pixel row selected by the first gate-on pulse, during a period that does not overlap a period during which the first gate-on pulse is applied, and the source drive circuit to apply a display signal voltage for normal display to the plurality of source bus lines, and in the stop preparation mode, the gate drive circuit to sequentially select the plurality of pixel rows by sequentially applying the first gate-on pulse to the plurality of gate bus lines, and sequentially apply the second gate-on pulse to the plurality of buffer capacitor scanning lines, each of which is associated with the pixel row selected by the first gate-on pulse, during a period that at least partially overlaps a period during which the first gate-on pulse is applied, and the source drive circuit to apply 0 V to the plurality of source bus lines.

2. The liquid crystal display apparatus according to claim 1, wherein the control circuit includes a power source circuit configured to supply the power source voltage to each of the gate drive circuit and the source drive circuit, and a signal circuit configured to supply the control signal to each of the gate drive circuit and the source drive circuit, the power source circuit includes a detection circuit configured to generate a detection signal and outputs the detection signal to the signal circuit in a case that the main power source voltage is lower than a predetermined value, and in a case that the signal circuit receives the detection signal, the signal circuit is configured to switch modes from the display mode to the stop preparation mode.

3. The liquid crystal display apparatus according to claim 2, wherein the control circuit further includes a hold capacitor electrically connected to an input terminal of the main power source voltage via a switch and supplies the power source voltage from the hold capacitor to the gate drive circuit in the stop preparation mode.

4. The liquid crystal display apparatus according to claim 1, wherein the gate drive circuit includes a first shift register configured to determine a phase of the first gate-on pulse of the gate scanning signal supplied to each of the plurality of gate bus lines based on an output of each of a plurality of stages, and a second shift register configured to determine a phase of the second gate-on pulse of the buffer capacitor scanning signal supplied to each of the plurality of buffer capacitor scanning lines based on an output of each of a plurality of stages, the control circuit supplies common clock signals to the first shift register and the second shift register, supplies a first start pulse signal including a first start pulse to the first shift register, and supplies a second start pulse signal including a second start pulse to the second shift register, and the control circuit is configured to in the display mode, within one vertical scanning period, apply the first start pulse to the first shift register and after a lapse of a first period after applying the first start pulse to the first shift register, apply the second start pulse to the second shift register, and in the stop preparation mode, within one vertical scanning period, apply the first start pulse to the first shift register and substantially simultaneously with application of the first start pulse to the first shift register or after a lapse of a second period shorter than the first period, apply the second start pulse to the second shift register, or within one vertical scanning period, apply the second start pulse to the second shift register and substantially simultaneously with application of the second start pulse to the second shift register or after a lapse of a third period after the application of the second start pulse to the second shift register, apply the first start pulse to the first shift register.

5. The liquid crystal display apparatus according to claim 4, wherein $TgapA = Tg1onW - (Tg2 - Tg1)$ $TgapB = Tg2onW - (Tg1 - Tg2)$, and the first period is longer than TgapA, the second period is equal to or shorter than TgapA, and the third period is equal to or shorter than TgapB where a period from a rise of the first start pulse to a rise of the first gate-on pulse is Tg1, a period from a rise of the second start pulse to a rise of the second gate-on pulse is Tg2, a width of the first gate-on pulse is Tg1onW, a width of the second gate-on pulse is Tg2onW, a period from the rise of the first start pulse to the rise of the second start pulse in a case that a fall of the first gate-on pulse coincides with the rise of the second gate-on pulse is TgapA, and a period from the rise of the second start pulse to the rise of the first start pulse in a case that a fall of the second gate-on pulse coincides with the rise of the first gate-on pulse is TgapB.

6. The liquid crystal display apparatus according to claim 1, wherein in the stop preparation mode, the control circuit is configured to cause the gate drive circuit, within one vertical scanning period, to apply the first gate-on pulse to each of the plurality of gate bus lines two or more times, apply the second gate-on pulse to each of the plurality of buffer capacitor scanning lines two or more times, and apply a first instance of the second gate-on pulse to the buffer capacitor scanning line associated with a pixel row selected by a second instance of the first gate-on pulse.

7. The liquid crystal display apparatus according to claim 6, wherein the buffer capacitor scanning line associated with a certain pixel row is electrically connected to the gate bus line associated with a pixel row n rows away from the certain pixel row, and n is an integer of 1 to 4 in a case of m=2, and an integer of m−2 to m+2 in a case of m≠2, the gate drive circuit includes a shift register configured to determine a phase of the first gate-on pulse of the gate scanning signal supplied to each of the plurality of gate bus lines and a phase of the second gate-on pulse of the buffer capacitor scanning signal supplied to each of the plurality of buffer capacitor scanning lines based on an output of each of the plurality of stages, the control circuit supplies m types of clock signals (m is an integer of 2 or greater) having different phases from each other and a start pulse signal including a start pulse to the shift register, and in the stop preparation mode, the control circuit applies a start pulse to the shift register two or more times within one vertical scanning period.

8. The liquid crystal display apparatus according to claim 7, wherein a cycle of the m types of clock signals is three times or more of one horizontal scan period.

9. The liquid crystal display apparatus according to claim 6, wherein the shift register includes a plurality of unit circuits, each of which includes at least one TFT.

10. The liquid crystal display apparatus according to claim 1, wherein each of the plurality of pixels further includes a first auxiliary capacitor including a first auxiliary capacitor electrode electrically connected to the first pixel electrode, and a second auxiliary capacitor including a second auxiliary capacitor electrode electrically connected to the second pixel electrode, and in each of the plurality of pixels, a buffer capacitor counter electrode constituting the buffer capacitor by facing the buffer capacitor electrode with a dielectric layer interposed between the buffer capacitor counter electrode and the buffer capacitor electrode is electrically connected to a second auxiliary capacitor counter electrode constituting the second auxiliary capacitor by facing the second auxiliary capacitor electrode with a dielectric layer between the second auxiliary capacitor counter electrode and the second auxiliary capacitor electrode.

11. The liquid crystal display apparatus according to claim 1, wherein in the display mode, a polarity of the display signal voltage supplied to the plurality of source bus lines is inverted for each vertical scanning period.

12. The liquid crystal display apparatus according to claim 1, wherein each of the first TFT, the second TFT, and the third TFT includes a TFT having an oxide semiconductor layer.

13. The liquid crystal display apparatus according to claim 12, wherein the oxide semiconductor layer includes an In—Ga—Zn—O semiconductor.

14. A driving method of a liquid crystal display apparatus, the liquid crystal display apparatus including a plurality of pixels arranged in a matrix having a plurality of pixel rows and a plurality of pixel columns, a plurality of gate bus lines, each of which is associated with one of the plurality of pixel rows, a plurality of source bus lines, each of which is associated with one of the plurality of pixel columns, and a plurality of buffer capacitor scanning lines, each of which is associated with one of the plurality of pixel rows, each of the plurality of the pixels including a first liquid crystal capacitor including a first pixel electrode, a second liquid crystal capacitor including a second pixel electrode, a first TFT with a drain electrode connected to the first pixel electrode, a second TFT with a drain electrode connected to the second pixel electrode, and a buffer capacitor including a buffer capacitor electrode connected to the second pixel electrode via a third TFT, gate electrodes of the first TFT and the second TFT of each pixel of the plurality of pixels being connected to a gate bus line associated with a pixel row including the pixel, source electrodes of the first TFT and the second TFT of each pixel of the plurality of pixels being connected to a source bus line associated with a pixel column including the pixel, a gate electrode of the third TFT of each pixel of the plurality of pixels being connected to a buffer capacitor scanning line associated with a pixel row including the pixel, and the liquid crystal display apparatus further including a gate drive circuit configured to supply a gate scanning signal including a first gate-on pulse configured to turn on the first TFT and the second TFT to each of the plurality of gate bus lines, and a buffer capacitor scanning signal including a second gate-on pulse configured to turn on the third TFT to each of the plurality of buffer capacitor scanning lines, a source drive circuit configured to supply a source signal to each of the plurality of source bus lines, and a control circuit configured to supply a power source voltage and a control signal to each of the gate drive circuit and the source drive circuit, the driving method comprising:

causing the control circuit to switch modes from a display mode for normal display to a stop preparation mode in a case that a main power source voltage supplied to the control circuit drops, and control the gate drive circuit and the source drive circuit to make in the display mode, the gate drive circuit sequentially select the plurality of pixel rows by sequentially applying the first gate-on pulse to the plurality of gate bus lines, and sequentially apply the second gate-on pulse to the plurality of buffer capacitor scanning lines, each of which is associated with the pixel row selected by the first gate-on pulse, during a period that does not overlap a period during which the first gate-on pulse is applied, and the source drive circuit apply a display signal voltage for normal display to the plurality of source bus lines, and in the stop preparation mode, the gate drive circuit sequentially select the plurality of pixel rows by sequentially applying the first gate-on pulse to the plurality of gate bus lines, and sequentially apply the second gate-on pulse to the plurality of buffer capacitor scanning lines, each of which is associated with the pixel row selected by the first gate-on pulse, during a period that at least partially overlaps a period during which the first gate-on pulse is applied, and the source drive circuit apply 0 V to the plurality of source bus lines.

* * * * *